(12) United States Patent
Suzuki et al.

(10) Patent No.: US 9,931,962 B2
(45) Date of Patent: Apr. 3, 2018

(54) CONTROL DEVICE FOR ELECTRIC VEHICLE AND CONTROL METHOD FOR ELECTRIC VEHICLE

(71) Applicant: HITACHI AUTOMOTIVE SYSTEMS, LTD., Hitachinaka-shi, Ibaraki (JP)

(72) Inventors: Keisuke Suzuki, Kawasaki (JP); Hitoshi Kobayashi, Machida (JP); Tatsuyuki Yamamoto, Isehara (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/021,241

(22) PCT Filed: Sep. 10, 2014

(86) PCT No.: PCT/JP2014/073931
§ 371 (c)(1),
(2) Date: Mar. 10, 2016

(87) PCT Pub. No.: WO2015/045873
PCT Pub. Date: Apr. 2, 2015

(65) Prior Publication Data
US 2016/0221467 A1  Aug. 4, 2016

(30) Foreign Application Priority Data

Sep. 24, 2013  (JP) .................................. 2013-196947

(51) Int. Cl.
*B60T 8/173*  (2006.01)
*B60L 15/20*  (2006.01)
(Continued)

(52) U.S. Cl.
CPC ............. *B60L 15/20* (2013.01); *B60L 3/0061* (2013.01); *B60L 3/102* (2013.01); *B60L 3/12* (2013.01);
(Continued)

(58) Field of Classification Search
CPC .......... B60K 6/445; B60K 1/02; B60K 6/365; B60L 11/1851; B60L 2240/647;
(Continued)

(56) References Cited

U.S. PATENT DOCUMENTS 6,621,244 B1 * 9/2003 Kiyomiya .............. B60K 6/485
180/65.26
2009/0030595 A1 * 1/2009 Sugai ..................... B60K 6/445
701/112
(Continued)

FOREIGN PATENT DOCUMENTS

JP     H09-130911 A    5/1997
JP     2000-125410 A   4/2000
(Continued)

*Primary Examiner* — Dalena Tran
(74) *Attorney, Agent, or Firm* — Foley & Lardner LLP

(57) ABSTRACT

Provided are a control device for an electric vehicle and a control method for an electric vehicle capable of appropriately suppressing a vibration. In the control device for an electric vehicle according to the present invention, when a torque is controlled that is generated by a motor configured to generate a torque for braking or driving a drive wheel via a speed reduction mechanism and a drive shaft coupled to the speed reduction mechanism, the torque generated by the motor is controlled based on a rotational torque command value based on an accelerator operation or a brake operation by a driver, and a vibration suppression control torque command value for suppressing a vibration component
(Continued)

caused by a resonance of the vehicle. Then, when a predetermined condition is satisfied, the torque generated by the motor is reduced.

4 Claims, 19 Drawing Sheets

(51) Int. Cl.
*B60L 3/00* (2006.01)
*B60L 3/10* (2006.01)
*B60L 3/12* (2006.01)

(52) U.S. Cl.
CPC ....... *B60L 15/2045* (2013.01); *B60L 2240/24* (2013.01); *B60L 2240/421* (2013.01); *B60L 2240/423* (2013.01); *B60L 2240/461* (2013.01); *B60L 2240/465* (2013.01); *B60L 2250/26* (2013.01); *B60L 2260/26* (2013.01); *B60L 2270/145* (2013.01); *Y02T 10/645* (2013.01); *Y02T 10/7283* (2013.01)

(58) Field of Classification Search
CPC ...... B60W 10/06; B60W 10/08; B60W 10/26; B60W 20/00; B60W 30/025; Y02T 10/6239; Y02T 10/6286; Y02T 10/7005
USPC .................... 701/22, 37, 38, 70, 84; 280/5.5
See application file for complete search history.

(56) References Cited

U.S. PATENT DOCUMENTS

| | | | |
|---|---|---|---|
| 2009/0076693 A1* | 3/2009 | Kumazaki | B60K 6/442 701/55 |
| 2010/0235027 A1 | 9/2010 | Park et al. | |
| 2011/0213533 A1* | 9/2011 | Ueoka | B60K 6/445 701/66 |
| 2012/0065826 A1* | 3/2012 | Kinoshita | B60K 6/445 701/22 |

FOREIGN PATENT DOCUMENTS

| | | |
|---|---|---|
| JP | 2010-004705 A | 1/2010 |
| JP | 2010-215213 A | 9/2010 |
| JP | 2012-214179 A | 11/2012 |

* cited by examiner (a)

(b)

(c)

VIBRATION SUPPRESSION CONTROL TORQUE
RESTRICTION VALUE

|  | HIGH μ | LOW μ |
|---|---|---|
| GRIP | TL | TH |
| SLIP | TH | TH |

TL<TH

CONTROL DEVICE FOR ELECTRIC VEHICLE AND CONTROL METHOD FOR ELECTRIC VEHICLE

TECHNICAL FIELD

The present invention relates to a control device for an electric vehicle.

BACKGROUND ART

Hitherto, a technology described in Patent Literature 1 is known as a control device for an electric vehicle. In this vehicle, by calculating a vibration component suppression torque for suppressing a vibration component caused by a resonance of a vehicle, and imposing a predetermined restriction on the vibration component suppression torque, even when a noise is superimposed on the number of revolution to indicate a peculiar value, stabilization of control is achieved.

CITATION LIST

Patent Literature

PTL 1: JP 2000-125410 A

SUMMARY OF INVENTION

Technical Problem

However, when the restriction is imposed as described above, the vibration suppression control torque is always applied to a rotational variation of a motor. Thus, when a vibration caused by a backlash is generated when the torque is almost zero, there is such a fear that an appropriate vibration suppression torque cannot be applied, and the vibration is rather promoted than suppressed. Moreover, also when the electric vehicle is stopped and the torque is thus set to zero, there is such a fear that the motor continues the vibration. The present invention has been made in view of the above-mentioned problems, and therefore has an object to provide a control device for an electric vehicle and a control method for an electric vehicle capable of appropriately suppressing the vibration.

Solution to Problem

In order to attain the above-mentioned object, in a control device for an electric vehicle according to the present invention, when a torque is controlled that is generated by a motor configured to generate a torque for braking or driving a drive wheel via a speed reduction mechanism and a drive shaft coupled to the speed reduction mechanism, the torque generated by the motor is controlled based on a rotational torque command value based on an accelerator operation or a brake operation by a driver and a vibration suppression control torque command value for suppressing a vibration component caused by a resonance of the vehicle. Then, when a predetermined condition is satisfied, the torque generated by the motor is reduced.

DESCRIPTION OF EMBODIMENTS

[First Embodiment]

Figure 1:
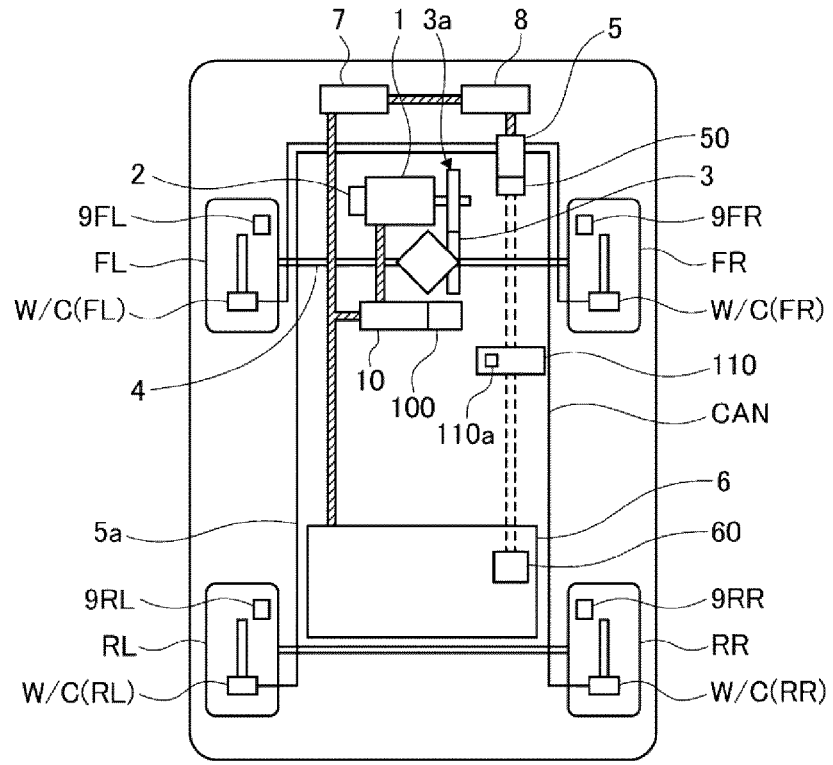
FIG. 1 is a system diagram for illustrating a configuration of an electric vehicle according to a first embodiment of the present invention.

FIG. 1 is a system diagram for illustrating a configuration of an electric vehicle according to a first embodiment of the present invention. The electric vehicle is a front wheel drive vehicle, and includes front wheels FR and FL, which are drive wheels, and rear wheels RR and RL, which are driven wheels. On each of the wheels, a wheel cylinder W/C(FR), W/C(FL), W/C(RR), or W/C(RL) (also simply referred to as W/C), which is configured to generate a friction braking force by pressing a brake pad to a brake rotor configured to integrally rotate with a tire, and a wheel speed sensor 9(FR), 9(FL), 9(RR), or 9(RL) (also simply referred to as 9), which is configured to detect a wheel speed of each wheel, are provided. To the wheel cylinder W/C, a hydraulic unit 5 is connected via a hydraulic pipe 5a.

The hydraulic unit 5 includes a plurality of solenoid valves, a reservoir, a pump motor, and a brake controller 50, and is configured to control, based on a command from the brake controller 50, drive states of the various solenoid valves and the pump motor, thereby controlling wheel cylinder hydraulic pressures for the respective wheels. Note that, the hydraulic unit 5 may be a widely known brake-by-wire unit, or a brake unit including a hydraulic circuit capable of carrying out vehicle stability control, and is thus not limited.

On an electric motor 1, which is a drive source, a resolver 2 configured to detect a motor rotational angle is provided. To the electric motor 1, a differential gear 3 is connected via a speed reduction mechanism 3a, and, to a drive shaft 4 connected to the differential gear 3, the front wheels FR and FL are connected. On a rear part of the vehicle, a high-voltage battery 6 configured to supply an electric power for driving to the electric motor 1, or recover a regenerative electric power, and a battery controller 60 configured to monitor and control a battery state of the high-voltage battery 6 are mounted. An inverter 10 interposed between the high-voltage battery 6 and the electric motor 1 is controlled by a motor controller 100. Moreover, to the high-voltage battery 6, an accessory battery 8 is connected via a DC-DC converter 7 (component), and the accessory battery 8 functions as a power supply for driving of the hydraulic unit 5.

On the electric vehicle according to the first embodiment, a CAN communication line is provided, which is an onboard communication line to which a plurality of controllers installed on the vehicle are connected. The brake controller 50, a vehicle controller 110, the battery controller 60, and the like are connected for mutual information communication. Note that, a power steering controller 20 configured to control a power steering device configured to assist a steering operation by a driver and a meter controller 22 configured to control a speedometer configured to indicate a vehicle speed, which are not shown in FIG. 1, are connected to the CAN communication line. Moreover, on the power steering controller 20, a steering angle sensor 21 configured to detect a steering angle of a steering wheel is provided.

Figure 2:
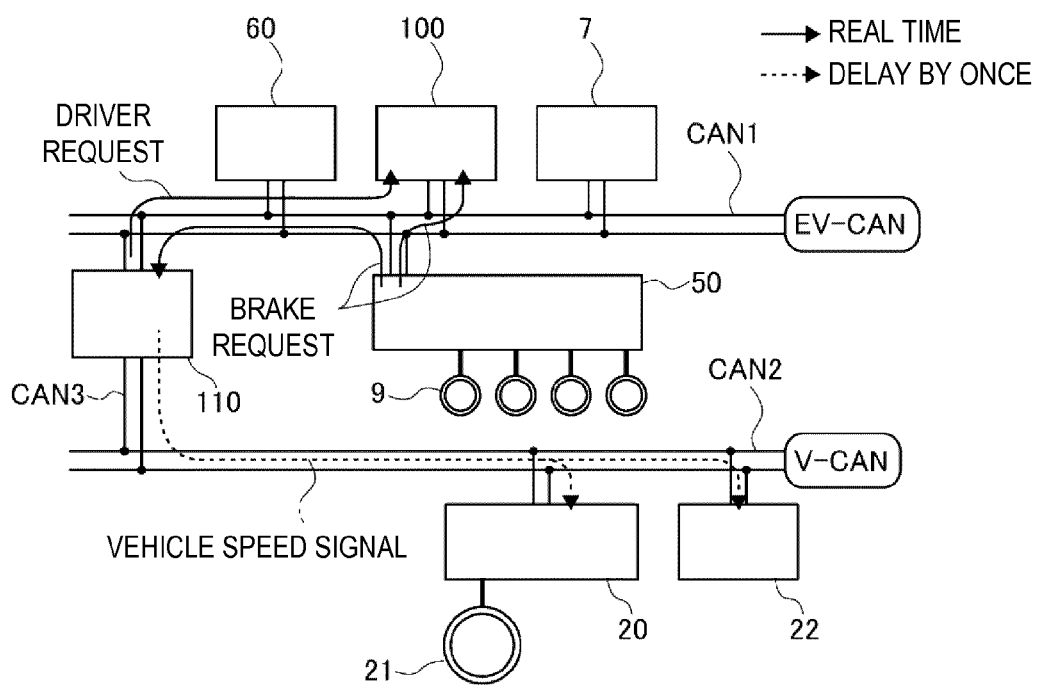
FIG. 2 is a schematic diagram for illustrating a connection state among various controllers according to the first embodiment.

FIG. 2 is a schematic diagram for illustrating a connection state of the various controllers according to the first embodiment. In the electric vehicle according to the first embodiment, the battery controller 60, the motor controller 100, the DC-DC converter 7, and the brake controller 50, which are configured to control a torque state acting between each of the drive wheels and the road surface, are grouped into a powertrain system, and are connected to a first CAN bus CAN1 (first communication device). Moreover, a chassis system including the power steering controller 20 and the meter controller 22 is connected to a second CAN bus CAN2 (second communication device).

The first CAN bus CAN1 and the second CAN bus CAN2 are connected with each other via a connection bus CAN3. On the connection bus CAN3, the vehicle controller 110 is provided, and information transmitted or received on the first CAN bus CAN1 is received by the vehicle controller 110 on the connection bus CAN3, and is then output to the second CAN bus CAN2. Similarly, information transmitted or received on the second CAN bus CAN2 is received by the vehicle controller 110 on the connection bus CAN3, and is then output to the first CAN bus CAN1.

(Connection Configuration of Controllers)

Figure 3:
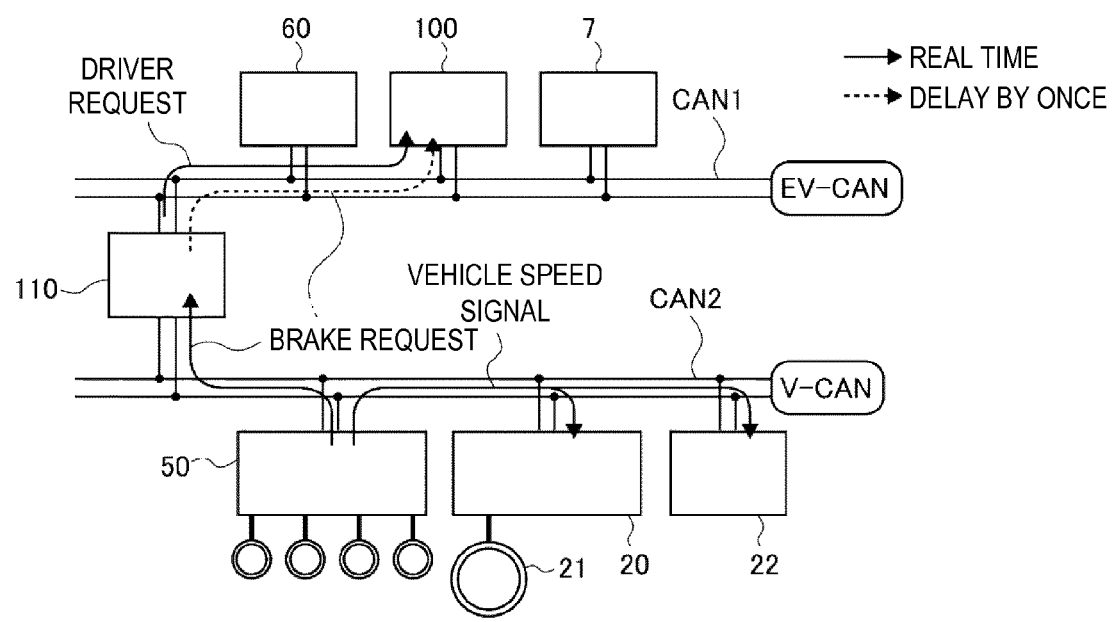
FIG. 3 is a schematic diagram for illustrating a connection state among various controllers according to a comparative example.

A description is now given of a reason for the configuration of the connection relationship among the controllers in comparison with a schematic diagram for illustrating the connection state of a comparative example. FIG. 3 is a schematic diagram for illustrating the connection state among the various controllers according to the comparative example. Hitherto, when a control system for a vehicle is constructed, as illustrated in FIG. 3, the brake controller 50 is connected to the second CAN bus CAN2. This is because, hitherto, the control for the brake system is included in control for the chassis system, and is thus not considered to be included in control for the powertrain system. For example, in terms of an increase in efficiency of a vehicle development, the respective systems such as the powertrain system, the brake system, a steering system, and a suspension system are often respectively developed as individual systems. When these individually developed systems are unified as an overall vehicle system, the unification is carried out by connection to a CAN communication line. The CAN communication line is limited in the number of controllers that can be connected, but can easily connect a plurality of controllers to be grouped. Thus, in the conventional system, the controllers are divided into a group in which the controllers in the chassis system are connected as a whole and a group in which the controllers in the powertrain system are connected as a whole, and, on the connection bus configured to connect between the respective groups, the vehicle controller is provided so as to control the entire vehicle.

On this occasion, in the configuration of the comparative example, a sufficient travel performance is hard to be secured in some cases. For example, at the time of vehicle start, when a driver excessively depresses an accelerator pedal and a large torque is output to the drive wheel, a drive slip may be generated. In order to suppress the drive slip, the brake controller 50 requests the vehicle controller 110 to suppress the slip state. Then, the vehicle controller 110 outputs a request such as a torque decrease to the motor controller 100 based on the request received from the brake controller 50.

However, such processing that the information sent on the second CAN bus CAN2 is once received by the vehicle controller 110, and then is sent on the first CAN bus CAN1 is carried out. Therefore, the brake request output from the brake controller 50 is output to the motor controller 100 at a communication timing delayed by once. The delay is thus generated to cause a state in which the drive slip cannot be effectively suppressed. Particularly when the drive wheel slips, an inertia of the drive wheel is extremely less than an inertia of the vehicle, and a rotation state thus tends to abruptly change accordingly. Moreover, it is conceivable to increase a control gain or a communication speed, but the CAN communication line is designed so as to easily connect various additional systems. Therefore, even when the control gain and the control cycle of only the brake controller are increased, a limit is imposed by a communication speed on the CAN communication line, and it is thus difficult to secure a sufficient responsiveness.

Thus, according to the first embodiment, from such a viewpoint that the brake controller 50 is a system configured to control the torque between the drive wheel and the road surface, the brake controller 50 is included in the powertrain system, and is connected to the first CAN communication line CAN1. In this case, the vehicle speed information and the like output from the brake controller 50 are slightly delayed in the timing to transmit to the second CAN bus CAN2, but the vehicle speed does not change abruptly due to the magnitude of the inertia of the vehicle, and there poses no problem.

(Problem Specific to Electric Vehicle)

A description is now given of a problem specific to the electric vehicle. Hitherto, in a vehicle system configured to use wheel speed data to control the powertrain system including an internal combustion engine, the wheel speed data and the torque decrease request are often received from the brake controller 50, and are used. The reason is as follows. Even if control for the internal combustion engine is devised, responsiveness to actually reflect to an output torque is limited, and the responsiveness of the CAN communication line thus rarely poses a problem as a bottleneck in responsiveness required in development of the powertrain. Thus, when the torque decrease request and the wheel speed data are used in the development of the powertrain, the wheel speed detection performance cultivated in the development of the brake system is often directly used for the control. This basic design idea is actually often followed also in the development of the electric vehicle.

On the other hand, on the electric vehicle in which the electric motor 1 is connected to the drive wheels, the responsiveness of the torque control is much better than that of the internal combustion engine, and more precise drive wheel slip control can be carried out. In order to attain control taking advantage of the good responsiveness of the electric motor 1, the responsiveness of the CAN communication line has come to pose a problem. Based on this background, in order to build a system taking advantage of the high responsiveness of the electric motor 1, such a system that the wheel speed data is not received from the brake controller 50 as secondary information, but is received as primary information to calculate a control amount needs to be built.

Moreover, it is important for the vehicle controller 110 configured to control the entire vehicle to monitor and control the entirety, but if such an excessive centralization that, after all information is gathered, all commands are issued to the respective controllers is carried out, a calculation load on the vehicle controller 110 increases, and an extremely expensive controller is necessary. Moreover, the vehicle controller 110 also considers information on a low communication speed, and then outputs a command, and thus, even if an expensive vehicle controller 110 is employed, a vehicle system good in the responsiveness cannot be built. Moreover, it is conceivable to transmit or receive all information quickly, but an increase in a communication speed is a specification change influencing all other controllers connected to this communication line, and it is very difficult to increase the entire communication speed in a complex system.

Thus, according to the first embodiment, the configuration of the CAN communication line is divided into the first CAN bus CAN1 and the second CAN bus CAN2. In addition, such a configuration that the vehicle controller 110 does not output all the commands, but controllers on levels lower than the vehicle controller 110 make determinations and carry out control to some extent is constructed. Specifically, in order to enable determination of a final motor torque command value in the motor controller 100 by priority over the vehicle controller 110, such a configuration that the brake request output from the brake controller 50 can directly be transmitted to the motor controller 100 is provided. Further, such a configuration that the motor controller 100 can read, in addition to the normal torque request from the vehicle controller 110, the brake request from the brake controller 50, and can output the final motor torque command value depending on the travel state is provided.

(Information Transmitted or Received by Controllers)

Figure 4:
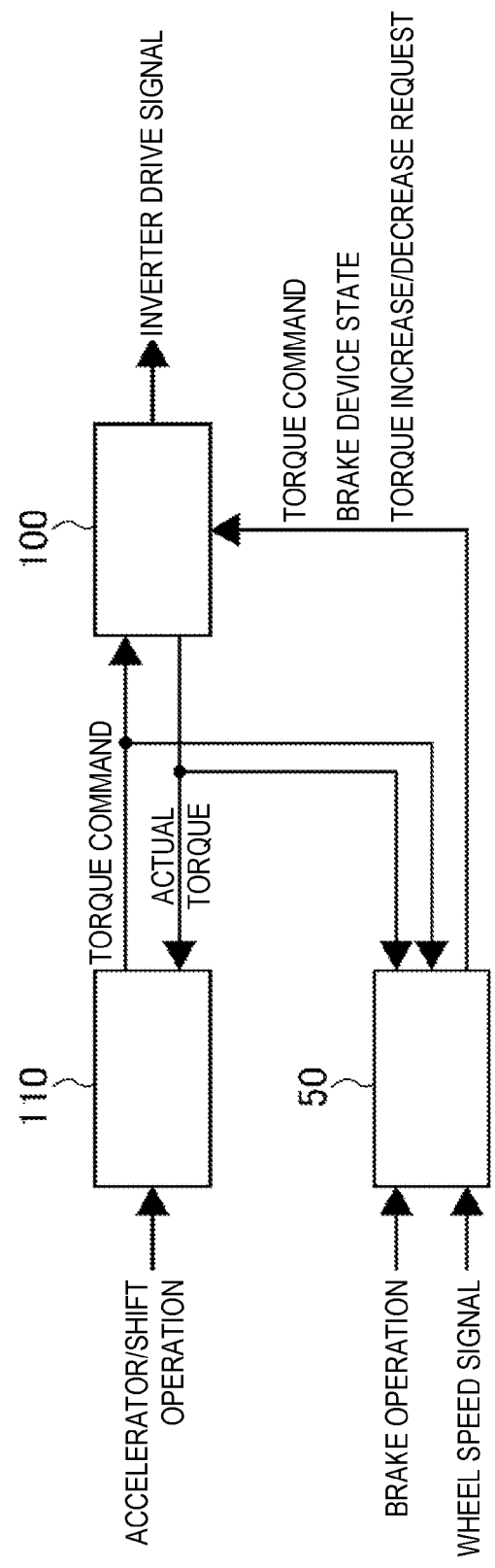
FIG. 4 is a control block diagram for illustrating contents of information to be transmitted or received by the respective controllers according to the first embodiment.

FIG. 4 is a control block diagram for illustrating contents of information to be transmitted or received by the respective controllers according to the first embodiment. The vehicle controller 110 receives accelerator pedal position information and shift position information, calculates a first torque command value based on a basic driver request torque and other results of control processing, and outputs the first torque command value to the motor controller 100 and the brake controller 50. The brake controller 50 receives an on/off state of a brake switch representing a brake pedal operation state and a wheel speed signal of each wheel, and outputs, for example, a second torque command value based on a request from a traction control, a brake device state representing whether or not the hydraulic unit 5 and the brake controller 50 are normally operating, and a torque increase/decrease request such as an increase, a decrease, or no increase/decrease in response to a driver request.

In the motor controller 100, when the brake device state is normal, and when a result of a comparison between the first torque command value and the second torque command value matches the torque increase/decrease request, the second torque command value from the brake controller 50 is employed, and when these conditions are not satisfied, the first torque command value is employed. As a result of these determinations, even if a problem such as a communication failure occurs, the motor controller 100 is prevented from operating against the intentions of the driver and the brake controller 50.

(Details of Control in Controllers)

Figure 5:
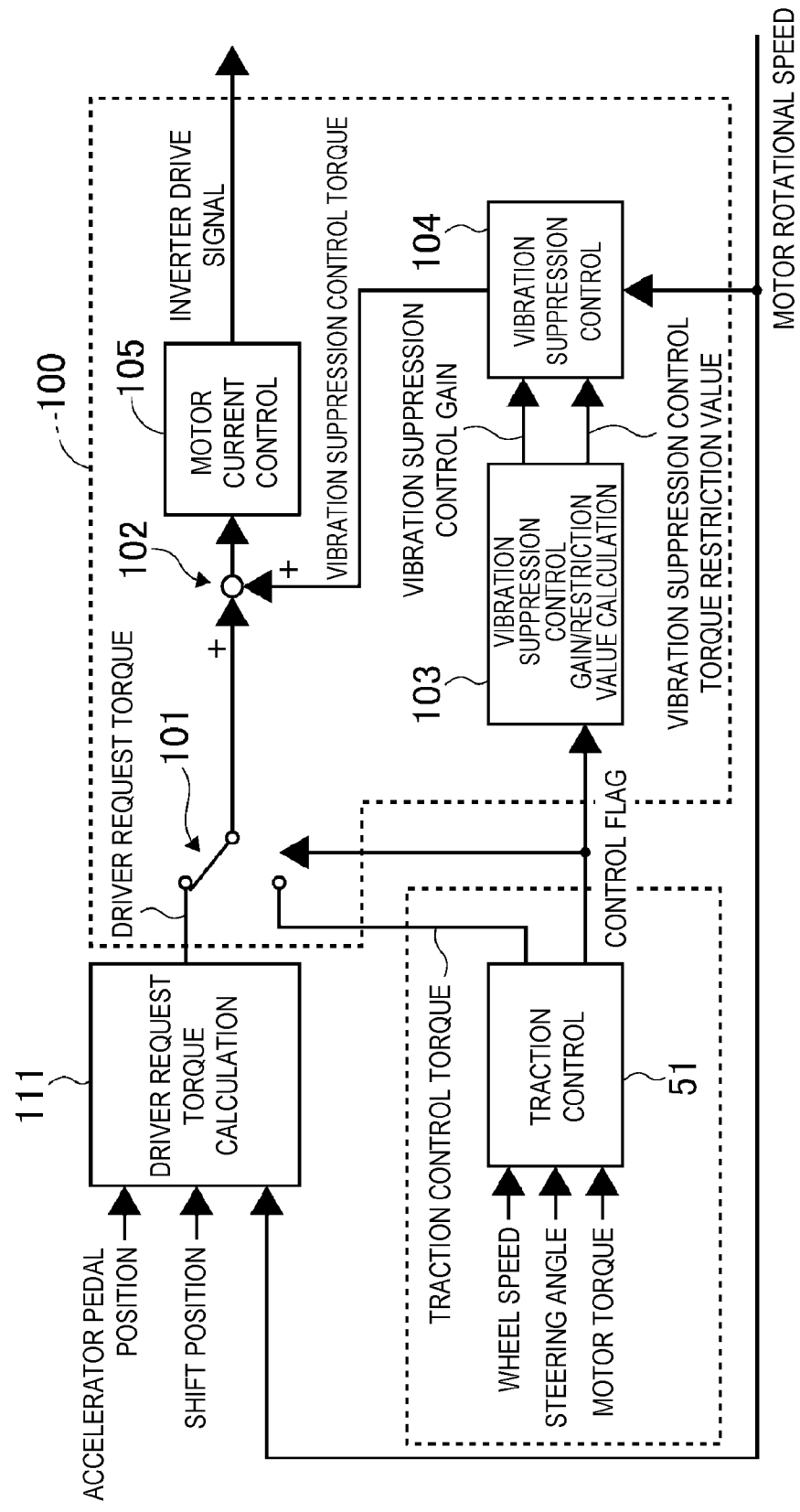
FIG. 5 is a control block diagram for illustrating a request of each of a vehicle controller and a traction control provided in a brake controller, and a control content to be carried out by a motor controller according to the first embodiment.

FIG. 5 is a control block diagram for illustrating a request of each of the vehicle controller and the traction control provided in the brake controller, and a control content to be carried out by the motor controller according to the first embodiment. In FIG. 5, a specialized description is given of the content of the traction control. A driver request torque command value calculation unit 111 in the vehicle controller 110 calculates the driver request torque (first torque command value) based on an accelerator pedal opening degree and a shift position, and outputs the driver request torque to the motor controller 100. A traction control unit 51 in the brake controller 50 receives the wheel speed information from the wheel speed sensors 9, the steering angle information from the steering angle sensor, and an actual motor torque output by the electric motor 1. Then, the traction control unit 51 determines whether or not the drive wheel is in the drive slip state. When the drive wheel is in the drive slip state, the traction control unit 51 outputs the traction control torque (second torque command value) for suppressing the drive slip, and outputs a control flag representing the control content carried out in the brake controller 50 to the motor controller 100.

The motor controller 100 includes a changeover switch 101 configured to switch, based on the control flag, the command value to be selected between the driver request torque and the traction control torque, a torque addition unit 102 configured to add a vibration suppression control torque to be described later to a switched torque command value TMCIN*, thereby outputting a final torque command value, a motor current control unit 105 configured to output an inverter drive signal to the inverter 10 in order to control the current to be supplied to the electric motor 1 based on the final torque command value, a vibration suppression control information calculation unit 103 configured to calculate a vibration suppression control gain and a vibration suppression control restriction value for suppressing a vibration of a drive system to be generated in the powertrain system, and a vibration suppression control unit 104 configured to apply high-pass filtering to the calculated vibration suppression control information and the motor rotational speed to detect a high-frequency component, and calculate, based on the detected high-frequency component, a vibration suppression control torque for suppressing the vibration of the powertrain system. Note that, the high-pass filter is employed in the first embodiment, but an observer may be used for estimation.

Figure 6:
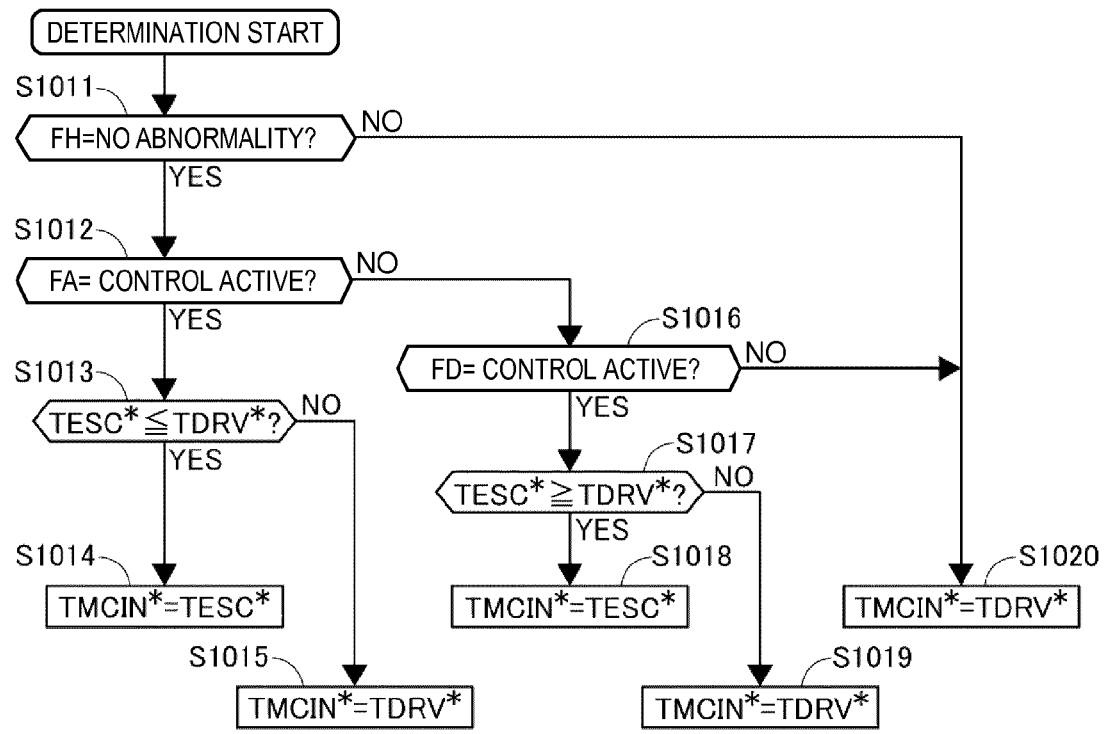
FIG. 6 is a flowchart for illustrating command value selection processing according to the first embodiment.

FIG. 6 is a flowchart for illustrating the command value selection processing according to the first embodiment. In the changeover switch 101, as a result of the following determination processing, any one of a driver request torque command value TDRV* and a slip control torque command value TESC* is output as the torque command value TMCIN*. Note that, in the brake controller 50, an acceleration slip control flag FA and a deceleration slip control flag FD representing a slip control state are provided in the traction control unit 51, and further, an ESC state flag FH representing an abnormal state of the hydraulic unit 5 or the brake controller 50 itself is provided. In Step S1011, it is determined whether or not the ESC state flag FH represents a no abnormality state. When there is no abnormality, the processing proceeds to Step S1012, and, when there is an abnormality, the processing proceeds to Step S1020 so as not to select the command from the brake controller 50, but switch from the torque command value TMCIN* to the driver request torque command value TDRV*.

In Step S1012, it is determined whether or not the acceleration slip control flag FA represents that the control is active. When the control is active, the processing proceeds to Step S1013, and when the control is inactive, the processing proceeds to Step S1016. In Step S1013, it is determined whether or not the slip control torque command value TESC* is equal to or less than the driver request torque command value TDRV*. When the slip control torque command value TESC* is equal to or less than the driver request torque command value TDRV*, the processing proceeds to Step S1014 so as to switch from the torque command value TMCIN* to the slip control torque command value TESC*. In other words, during the acceleration slip control, the torque decrease should be applied to the driver request torque command value TDRV*, and when the slip control torque command value TESC* is equal to or less than the driver request torque command value TDRV*, the lower torque needs to be selected to suppress the slip. On the other hand, even during the acceleration slip control, when the slip control torque command value TESC* is more than the driver request torque command value TDRV*, the acceleration slip tends to be promoted, and, in this case, the processing proceeds to Step S1015 so as to switch from the torque command value TMCIN* to the driver request torque command value TDRV*.

In Step S1016, it is determined whether or not the deceleration slip control flag FD represents that the control is active. When the control is active, the processing proceeds to Step S1017, and when the control is inactive, the processing proceeds to Step S1020. In Step S1017, it is determined whether or not the slip control torque command value TESC* is equal to or more than the driver request torque command value TDRV*. When the slip control torque command value TESC* is equal to or more than the driver request torque command value TDRV*, the processing proceeds to Step S1018 so as to switch from the torque command value TMCIN* to the slip control torque command value TESC*. In other words, during the deceleration slip control, as a result of generation of a regenerative torque as the driver request torque command value TDRV*, a slip is generated, and when, in order to increase the torque to eliminate this slip, the slip control torque command value TESC* is equal to or more than the driver request torque command value TDRV*, appropriate control is considered to be carried out. On the other hand, even during the deceleration slip control, when the slip control torque command value TESC* is less than the driver request torque command value TDRV*, the deceleration slip tends to be promoted, and, in this case, the processing proceeds to Step S1019 so as to switch from the torque command value TMCIN* to the driver request torque command value TDRV*.

Figure 7:
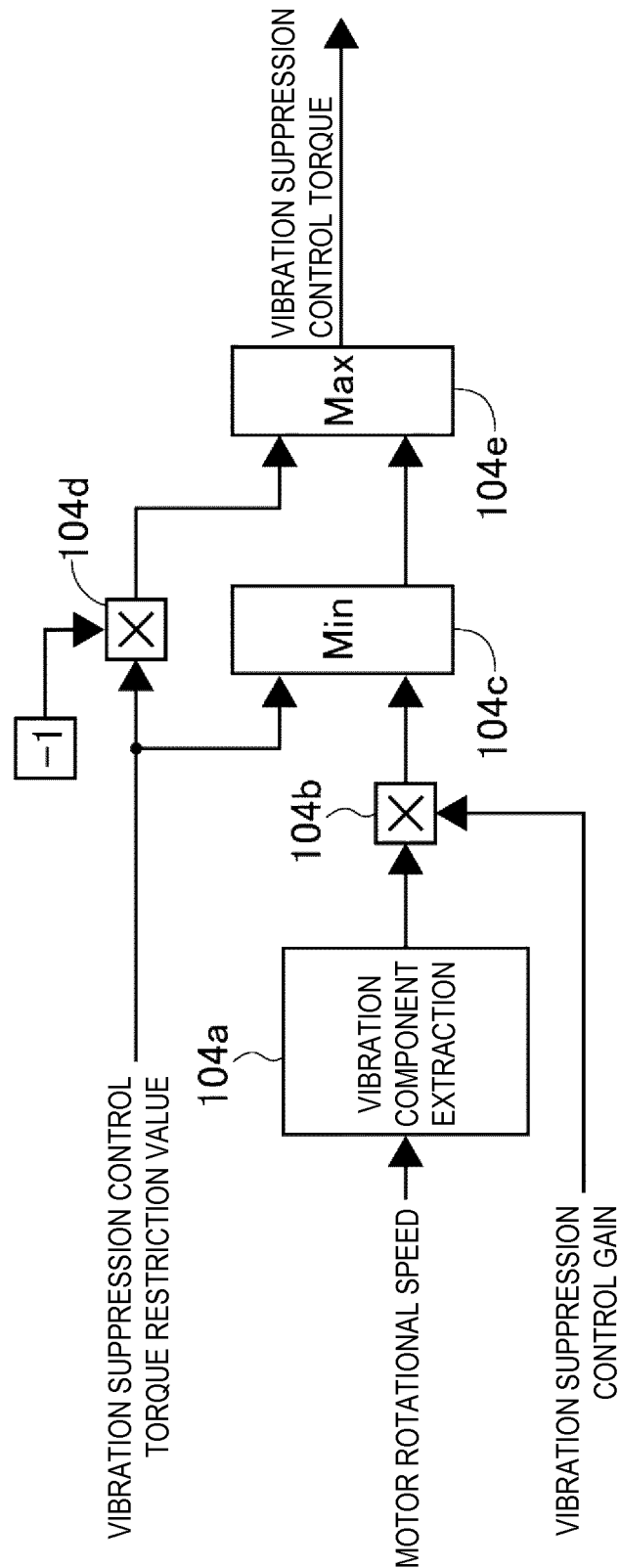
FIG. 7 is a control block diagram for illustrating vibration suppression control torque command value calculation processing according to the first embodiment.

FIG. 7 is a control block diagram for illustrating vibration suppression control torque command value calculation processing according to the first embodiment. The vibration suppression control unit 104 includes a vibration component extraction unit 104a configured to extract a vibration component from the motor rotational speed. The vibration component extraction unit 104a is constructed by a high-pass filter, and passes only a predetermined high-frequency component. A gain multiplication unit 104b multiplies the vibration component that has passed through the high-pass filter by a vibration control gain. A torque restriction unit 104c compares magnitudes of the vibration suppression control torque restriction value and the vibration suppression control torque after the gain multiplication with each other, and selects a smaller one. A negative value multiplication unit 104d multiplies the vibration suppression control torque restriction value by a negative value. A torque restriction unit 104e compares magnitudes of a negative value of the vibration suppression control torque restriction value and the vibration suppression control torque selected by the torque restriction unit 104c, with each other, and selects a larger one. As a result, the vibration suppression control torque corresponding to the vibration component is calculated, and generation of an excessive vibration suppression control torque is suppressed.

(Slip Control)

Figure 8:
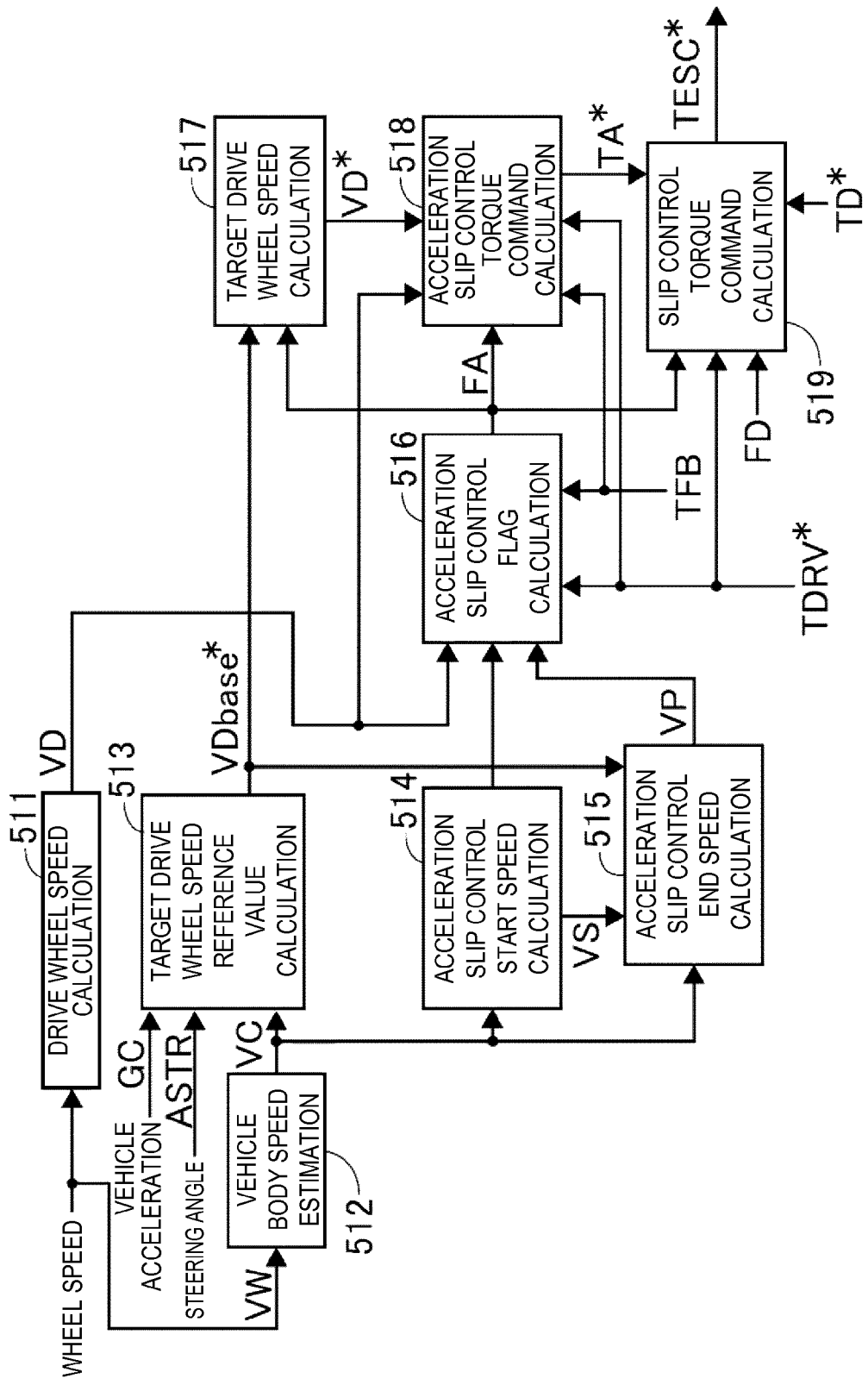
FIG. 8 is a control block diagram for illustrating slip control to be carried out by a traction control unit according to the first embodiment.

FIG. 8 is a control block diagram for illustrating slip control to be carried out by the traction control unit according to the first embodiment. A drive wheel speed calculation unit 511 calculates a drive wheel speed VD based on detected wheel speeds VW. A vehicle body speed estimation unit 512 calculates an estimated vehicle body speed VC based on the wheel speeds VW. For example, the vehicle body speed may be estimated based on an average of vehicle body speeds calculated from the wheel speeds of the respective driven wheels, may be an average of vehicle body speeds calculated from the wheel speeds of the respective four wheels, or may be the select-low of the driven wheels and drive wheels (acquiring the vehicle body speed by selecting a lower one of the wheel speeds of the driven wheels and the drive wheels), and thus there is no particular limitation. Moreover, the traction control unit includes a vehicle body acceleration detection unit configured to detect a vehicle body acceleration GC. This detection unit may be a G sensor configured to detect a longitudinal acceleration, or may use a derivative of the estimated vehicle body speed VC as the vehicle body acceleration GC, and is thus not particularly limited.

(Target Drive Wheel Speed Reference Value Calculation Processing)

Figure 9:
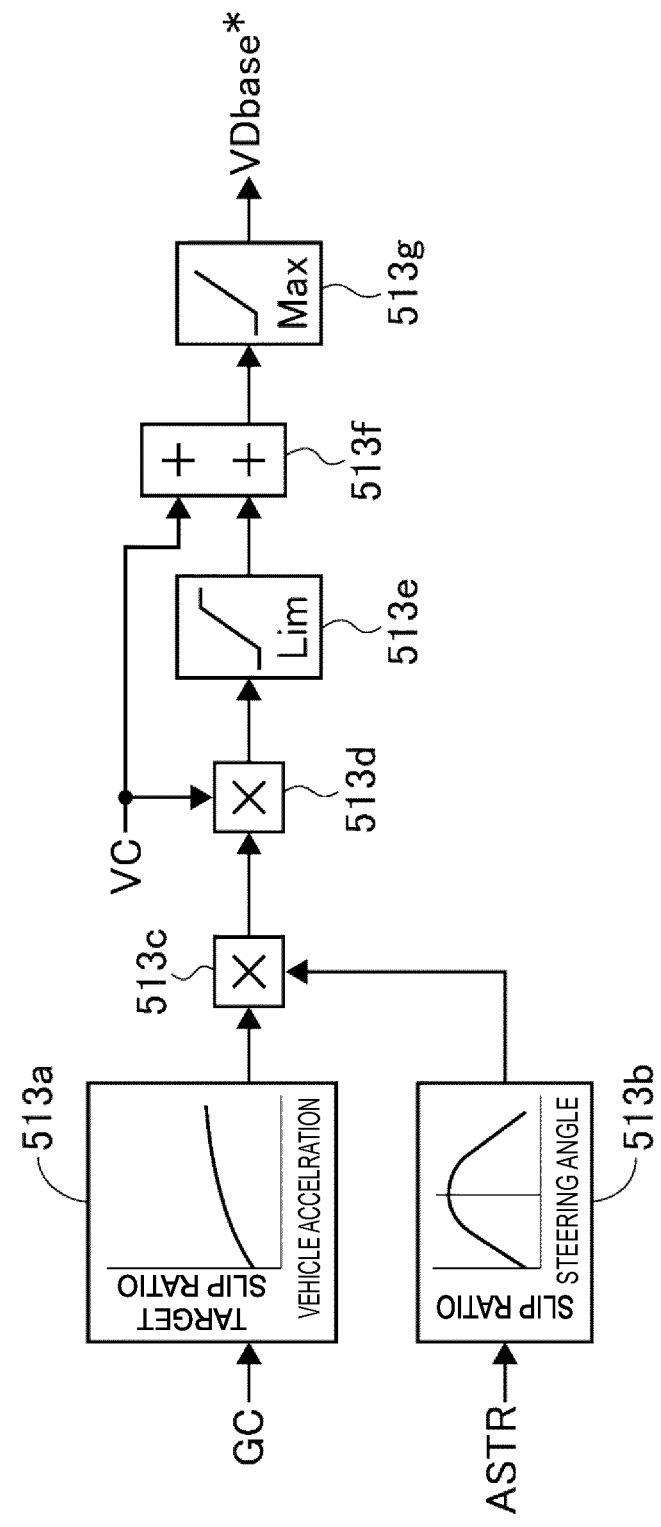
FIG. 9 is a control block diagram for illustrating target drive wheel speed reference value calculation processing according to the first embodiment.

A target drive wheel speed reference value calculation unit 513 calculates a target drive wheel speed reference value VDbase*, which is a target speed of each of the drive wheels, based on the vehicle body acceleration GC, a steering angle Astr, and the estimated vehicle body speed VC. FIG. 9 is a control block diagram for illustrating target drive wheel speed reference value calculation processing according to the first embodiment. An acceleration target slip ratio gain calculation unit 513a includes an acceleration target slip ratio gain map, and is set so as to calculate a larger acceleration target slip ratio gain as the detected acceleration GC increases. In other words, when a large acceleration is acquired, a friction force between the drive wheel and the road surface is considered to be secured even when a certain slip ratio is permitted. A steering angle target slip ratio gain calculation unit 513b includes a steering angle target slip ratio gain map, and is configured to calculate a larger steering angle target slip ratio gain when the detected steering angle is close to a neutral position, and calculate a smaller steering angle target slip ratio gain as the steering angle represents a larger steering state. In other words, in a straight travel state, less cornering force is necessary, and hence a large force is used in a longitudinal direction of a friction circle of the tire, while, in a steering state, a cornering force is necessary, and hence less force is used in the longitudinal direction of the friction circle of the tire and a force in a lateral direction is secured.

A slip ratio calculation unit 513c multiples the acceleration target slip ratio gain and the steering angle target slip ratio gain by each other, thereby calculating a target slip ratio reflecting both the states. A target slip amount calculation unit 513d multiples the calculated target slip ratio by the estimated vehicle body speed VC so as to calculate a target slip amount. A limiter processing unit 513e applies limit processing to the target slip amount so as to suppress an abrupt change in the target value. An addition unit 513f adds the target slip amount to the estimated vehicle body speed VC, thereby calculating a target drive wheel speed VD*. A limiter processing unit 513g applies limiter processing to the target drive wheel speed VD*, thereby calculating the target drive wheel speed reference value VDbase*. Note that, when a yaw rate sensor is provided, the following control may be carried out. That is, a yaw rate sensor value and an estimated yaw rate calculated from the steering angle and the estimated vehicle body speed VC may be compared with each other, and when a difference therebetween is large, the target slip ratio and the torque command value may be corrected to suppress the difference between the yaw rate sensor value and the estimated yaw rate.

(Acceleration Slip Control Start Speed Calculation Processing)

Figure 13:
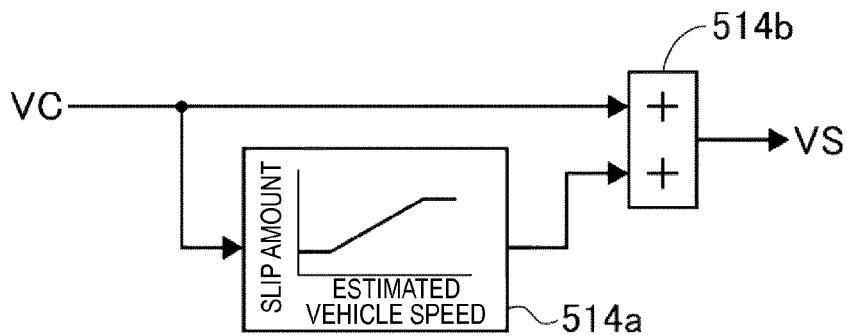
FIG. 13 is a control block diagram for illustrating acceleration slip control start speed calculation processing according to the first embodiment.

An acceleration slip control start speed calculation unit 514 calculates a control start speed VS based on the estimated vehicle body speed VC. FIG. 13 is a control block diagram for illustrating acceleration slip control start speed calculation processing according to the first embodiment. In a control start slip amount map 514a, as the estimated vehicle body speed VC increases, a larger slip amount is calculated. This is because, in terms of the slip ratio, a control start slip ratio is set to be approximately constant. Note that, in a low vehicle speed state including a start state, the calculation of the slip ratio is difficult, and the map 514a sets a constant slip amount. Then, an addition unit 514b adds the slip amount calculated from the control start slip amount map 514a to the estimated vehicle body speed VC, thereby calculating the control start speed VS.

(Acceleration Slip Control End Speed Calculation Processing)

Figure 14:
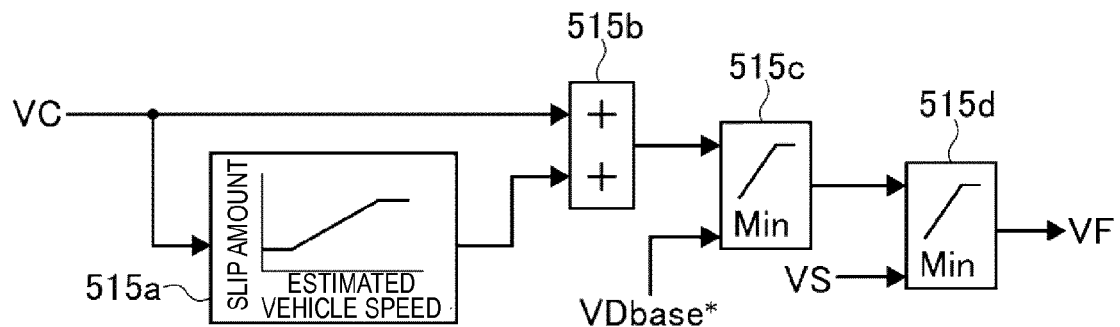
FIG. 14 is a control block diagram for illustrating acceleration slip control end speed calculation processing according to the first embodiment.

An acceleration slip control end speed calculation unit 515 calculates a control end speed VF based on the estimated vehicle body speed VC. FIG. 14 is a control block diagram for illustrating acceleration slip control end speed calculation processing according to the first embodiment. In a control end slip amount map 515a, as the estimated vehicle body speed VC increases, a larger slip amount is calculated. Note that, when the control end speed VF is set, in terms of avoidance of a control hunting, for the same estimated vehicle body speed VC, the slip amount set in the control end slip amount map 515a is set smaller than the slip amount set in the control start slip amount map 514a. Then, an addition unit 515b adds the slip amount calculated from the control end slip amount map 515a to the estimated vehicle body speed VC, thereby calculating a control end speed calculation value. Then, a first selection unit 515c selects smaller one of the control end speed calculation value and the target drive wheel speed reference value VDbase* so that the control end speed VF is set closer to the estimated vehicle body speed VC than to the target drive wheel speed reference value VDbase*, thereby preventing the hunting. Similarly, a second selection unit 515d selects smaller one of the selected value in the first selection unit 515c and the control start speed VS so that the control end speed VF is set closer to the estimated vehicle body speed VC than to the control start speed VS, thereby preventing the hunting. Then, the finally selected value is output as the control end speed VF.

(Acceleration Slip Control Flag Calculation Processing)

Figure 15:
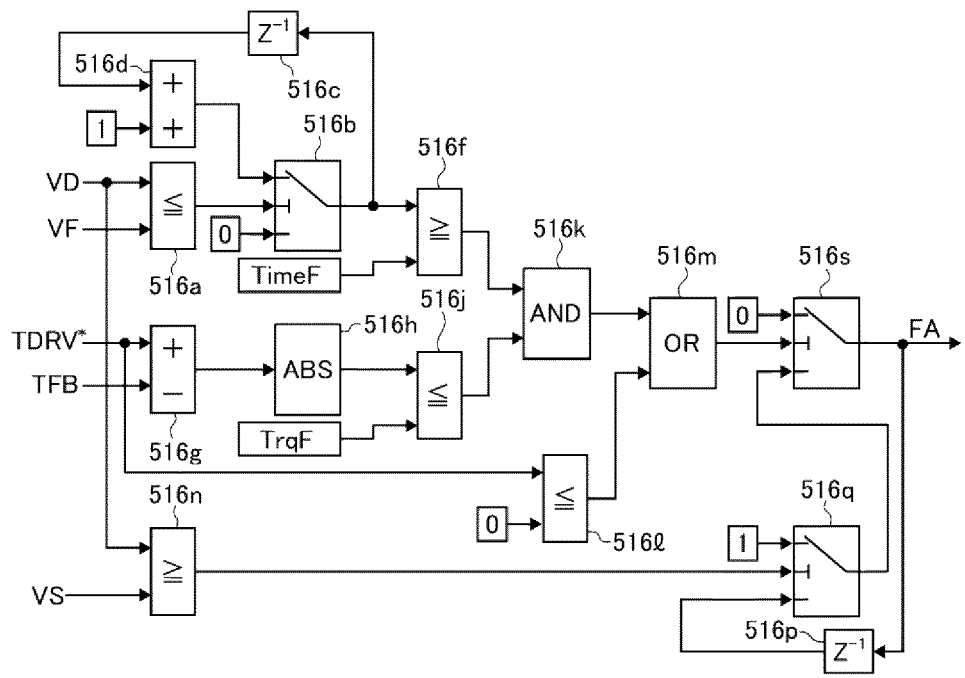
FIG. 15 is a control block diagram for illustrating acceleration slip control flag calculation processing according to the first embodiment.

An acceleration slip control flag calculation unit 516 determines, based on the state of the drive wheels, whether or not to carry out acceleration slip control. When the acceleration slip control is carried out, the acceleration slip control flag calculation unit 516 outputs the acceleration slip control flag FA set to ON, and, when the acceleration slip control is not carried out, the acceleration slip control flag calculation unit 516 outputs the acceleration slip control flag FA set to OFF. FIG. 15 is a control block diagram for illustrating acceleration slip control flag calculation processing according to the first embodiment. Note that, FIG. 15 is a diagram for illustrating a case in which a shift lever is at a D range, but basically the same processing is carried out for other shift ranges.

A control end determination unit 516a compares the drive wheel speed VD and the control end speed VF with each other, and, when the drive wheel speed VD is equal to or less than the control end speed VF, outputs a switch signal to an end side first switch 516b. The end side first switch 516b is a switch configured to switch between 0 and a counter value constructed by a previous value output unit 516c and a count-up unit 516d. When the switch signal is received from the control end determination unit 516a in a state in which 0 is selected during the drive slip control, the end side first switch 516b starts count up through the previous value output unit 516c and the count-up unit 516d, and outputs a count to a control end delay determination unit 516f. When the value output from the end side first switch 516b is equal to or more than a timer value TimeF set in advance, the control end delay determination unit 516f outputs a signal representing a state in which one of control end conditions is satisfied to an AND condition determination unit 516k. In other words, the control end delay determination unit 516f determines whether or not a period equal to or longer than TimeF has elapsed after the drive wheel speed VD becomes equal to or less than the control end speed VF, and when the period has elapsed, the control end delay determination unit 516f outputs the signal representing the state in which one of control end conditions is satisfied.

A torque deviation calculation unit 516g calculates a torque deviation between the driver request torque command value TDRV* and a final torque command value TFB directed to the electric motor 1, and outputs an absolute value thereof acquired by an absolute value processing unit 516h to a torque state determination unit 516j. When the torque deviation is equal to or less than a predetermined torque value TrqF set in advance, the torque state determination unit 516j outputs a signal representing a state in which one of the control end conditions is satisfied.

When the condition for the end determination and the delay processing based on the drive wheel speed VD is satisfied, and when such a condition that the driver request torque command value TDRV* approximately matches the torque instructed to the electric motor 1 is satisfied, the AND condition determination unit 516k outputs a control end condition satisfaction signal to an OR condition determination unit 516m. Moreover, when the driver request torque command value TRDV* is equal to or less than 0, a negative value determination unit 516l outputs a control end condition satisfaction signal. When any one of the AND condition determination unit 516k and the negative value determination unit 516l outputs the control end condition satisfaction signal, the OR condition determination unit 516m outputs a switch signal to a control flag switch 516s.

A control start determination unit 516n compares the drive wheel speed VD and the control start speed VS with each other, and, when the drive wheel speed VD is equal to or more than the control start speed VS, outputs a switch signal to a start side switch 516q, thereby outputting 1. Upon the control start determination, the slip of the drive wheel is increasing, and the control thus needs to be quickly started. Thus, the slip control is quickly started without a delay period or the like. When a signal of a control flag previous value output unit 516p, which is the previous value of the control flag switch 516s, is input to the start side switch 516q, and the start side switch 516q outputs 1 due to the switch signal from the control start determination unit 516n, if the condition becomes no longer satisfied in the control start determination unit 516n, the start side switch 516q switches from 1 to the control flag previous value. On this occasion, when the control end condition satisfaction signal is not output from the OR condition determination unit 516m, 1 is continuously output from the control flag switch 516s, and the control flag thus enters the ON state.

(Target Drive Wheel Speed Calculation Processing)

Figure 10:
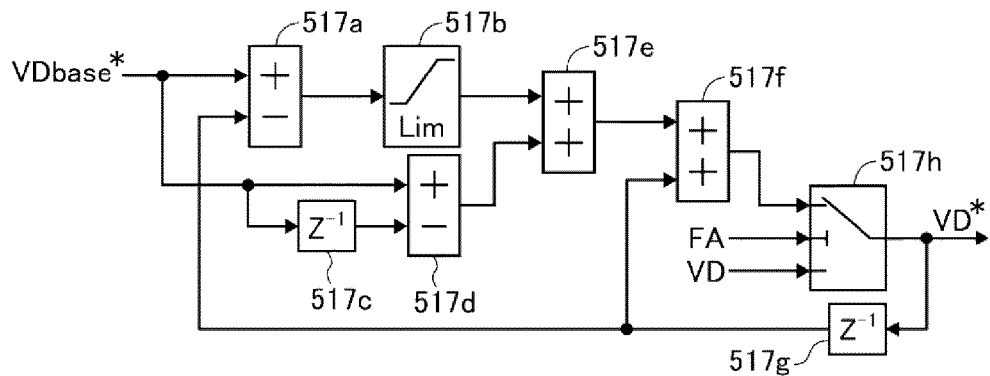
FIG. 10 is a control block diagram for illustrating target drive wheel speed calculation processing according to the first embodiment.

A target drive wheel speed calculation unit 517 calculates a target drive wheel speed VD* based on the target drive wheel speed reference value VDbase*. FIG. 10 is a control block diagram for illustrating target drive wheel speed calculation processing according to the first embodiment. Note that, in a state before the start of the slip control, the drive wheel speed VD is set as an initial value of the target drive wheel speed VD*. A target value deviation calculation unit 517a calculates a target value deviation between the target drive wheel speed reference value VDbase* and a previous target drive wheel speed VD* calculated by a target drive wheel speed previous value calculation unit 517g. A limiter 517b carries out limit processing for imposing a restriction on the deviation in order to attain a smooth torque change, and outputs the processed deviation to a first addition unit 517e. Moreover, a change amount calculation unit 517d calculates a change amount from a difference between a previous target drive wheel speed reference value VDbase*, which is output from a previous value output unit 517c configured to output a previous value of the target drive wheel speed reference value VDbase*, and a current target drive wheel speed reference value VDbase*, and outputs the change amount to the first addition unit 517e.

The first addition unit 517e adds the target value deviation and the change amount of the target drive wheel speed reference value VDbase* to each other, thereby calculating a change amount of the drive wheel speed to be changed in the control for this time. As a result, after the slip control starts, even when the target drive wheel speed reference value VDbase* makes a change exceeding the limit of the limiter 517b, the target drive wheel speed VD* can follow the target drive wheel speed reference value VDbase*. A second addition unit 517f adds the value output from the first addition unit 517e to the previous target drive wheel speed VD*, thereby calculating a primary target drive wheel speed, and outputs the primary target drive wheel speed to a target drive wheel speed changeover switch 517h. When the acceleration slip control flag FA is 0, the target drive wheel speed changeover switch 517h outputs the drive wheel speed VD as a final target drive wheel speed VD*, and, when the acceleration slip control flag FA is 1, outputs the primary target drive wheel speed as the final target drive wheel speed VD*.

(Acceleration Slip Control Torque Command Value Calculation Processing)

Figure 11:
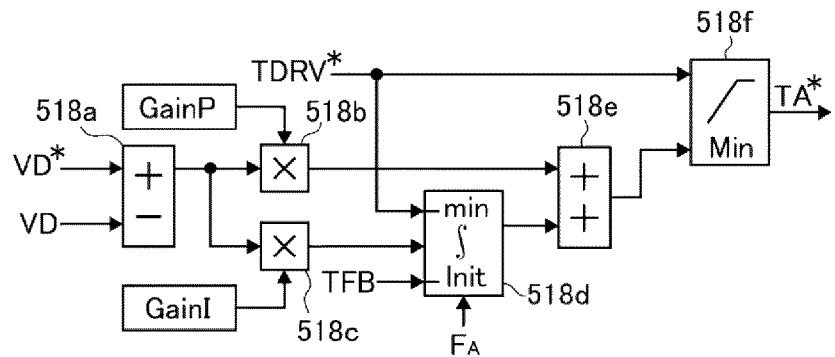
FIG. 11 is a control block diagram for illustrating acceleration slip control torque calculation processing according to the first embodiment.

An acceleration slip control torque command value calculation unit 518 calculates an acceleration slip control torque command value based on a deviation between the drive wheel speed VD and the target drive wheel speed VD*. FIG. 11 is a control block diagram for illustrating acceleration slip control torque calculation processing according to the first embodiment. A speed deviation calculation unit 518a calculates a speed deviation between the target drive wheel speed VD* and the drive wheel speed VD. A proportional gain multiplication unit 518b multiplies the speed deviation by a proportional gain Kp, thereby outputting a proportional component. An integral gain multiplication unit 518c multiples the speed deviation by an integral gain Ki. An integration unit 518d outputs, as an integral component, smaller one of an integral using the final torque command value TFB as an initial value and the driver request torque command value TDRV*. A PI control amount calculation unit 518e adds the proportional component and the integral component to each other, thereby outputting a PI control torque command value. An acceleration slip control torque command determination unit 518f outputs, as a final acceleration slip control torque command value TA*, smaller one of the driver request torque command value TDRV* and the PI control torque command value. Note that, an initial value of the target drive wheel speed VD* is the drive wheel speed VD, and hence the proportional component is zero, and the integral component is also set to the final torque command value TFB. The deviation is thus not generated immediately after the control start, and hence a torque fluctuation is not caused.

(Slip Control Torque Command Value Calculation Processing)

Figure 12:
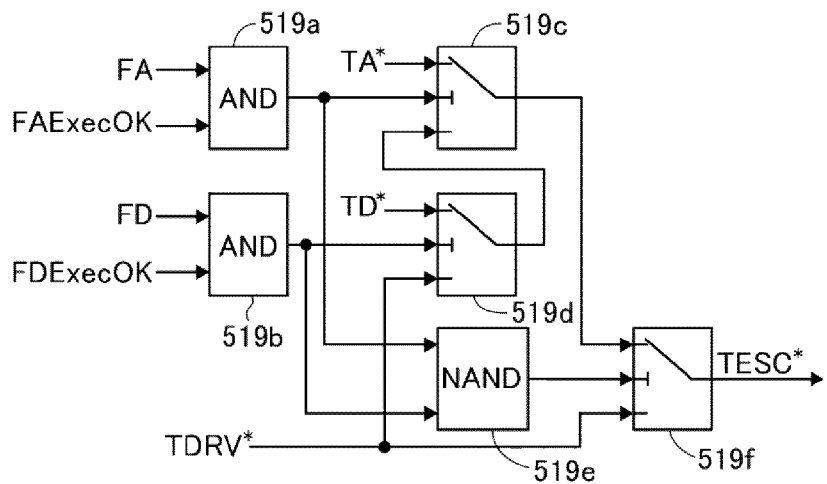
FIG. 12 is a control block diagram for illustrating slip control torque command value calculation processing according to the first embodiment.

A slip control torque command value calculation unit 519 selects, based on signals such as the acceleration slip control flag FA and the deceleration slip control flag FD, any one of the slip control torque command value TA* and the driver request torque command value TDRV*, thereby outputting a final slip control torque command value TESC*. FIG. 12 is a control block diagram for illustrating slip control torque command value calculation processing according to the first embodiment. An acceleration slip control execution permission flag FAExecOK and a deceleration slip control execution permission flag FDExecOK are respectively execution permission flags for the slip control. In a regeneration inhibition state, when a slip control off switch is depressed, or when a certain abnormality (such as a wheel speed sensor abnormality) is detected, the slip control is inhibited, and otherwise is permitted. When both the acceleration slip control flag FA and the acceleration slip control execution permission flag FAExecOK satisfy the conditions, an acceleration side AND determination unit 519a outputs a switch signal to an acceleration slip control torque command value changeover switch 519c and a NAND determination unit 519e. Similarly, when both the deceleration slip control flag FD and the deceleration slip control execution permission flag FDExecOK satisfy the conditions, a deceleration side AND determination unit 519b outputs a switch signal to a deceleration slip control torque command value changeover switch 519d and the NAND determination unit 519e. Note that, the NAND determination unit 519e is configured to determine, when the acceleration slip control flag FA and the deceleration slip control flag FD are simultaneously satisfied, that there is an abnormality, to thereby carry out processing so as not to follow the slip control request but to output the driver request torque command value TDRV*.

When the acceleration slip control request is output from the acceleration side AND determination unit 519a, a first torque command value changeover switch 519c switches from the signal (TD* or TDRV*), which is output from the deceleration slip control torque command value changeover switch 519d, to the acceleration slip control torque command value TA*, thereby outputting the acceleration slip control torque command value TA* to a slip control torque command value calculation unit 519f. When the acceleration slip control request is not output, the first torque command value changeover switch 519c outputs the signal output from the second torque command value changeover switch 519d. When the deceleration slip control request is output from the deceleration side AND determination unit 519b, the second torque command value changeover switch 519d switches from the driver request torque command value TDRV* to the deceleration slip control torque command value TD*, thereby outputting the deceleration slip control torque command value TD* to the first torque command value changeover switch 519c, and when the deceleration slip control request is not output, the second torque command value changeover switch 519d outputs the driver request torque command value TDRV* to the first torque command value changeover switch 519c. When the NAND determination unit 519e makes the abnormality determination, the slip control torque command value calculation unit 519f outputs the driver request torque command value TDRV* as the slip control torque command value TESC*, and when the abnormality determination is not made, the slip control torque command value calculation unit 519f outputs the signal output from the first torque command value changeover switch 519c as the slip control torque command value TESC*.

(Effect Acquired by Slip Control Improved in Responsiveness)

Figure 16:
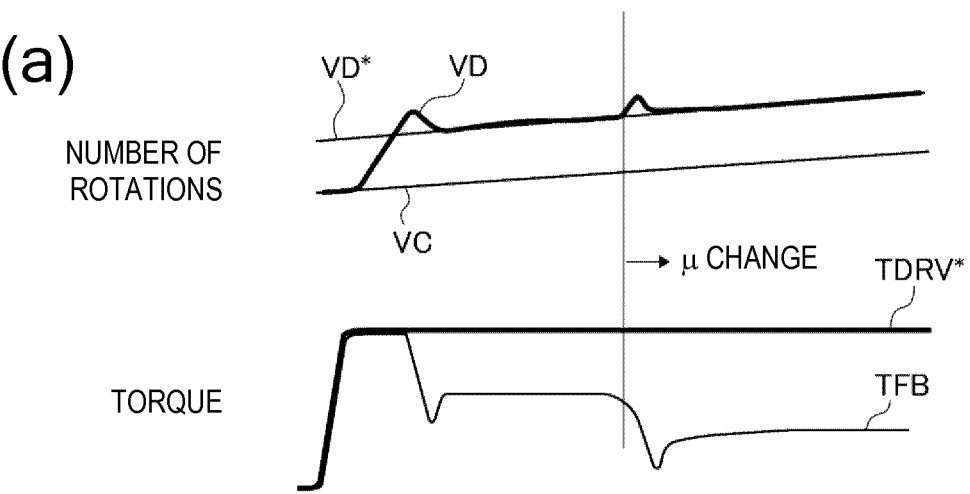
FIG. 16 are time charts for illustrating a relationship between the number of rotations and a torque when drive slip control is carried out.
Figure 16:
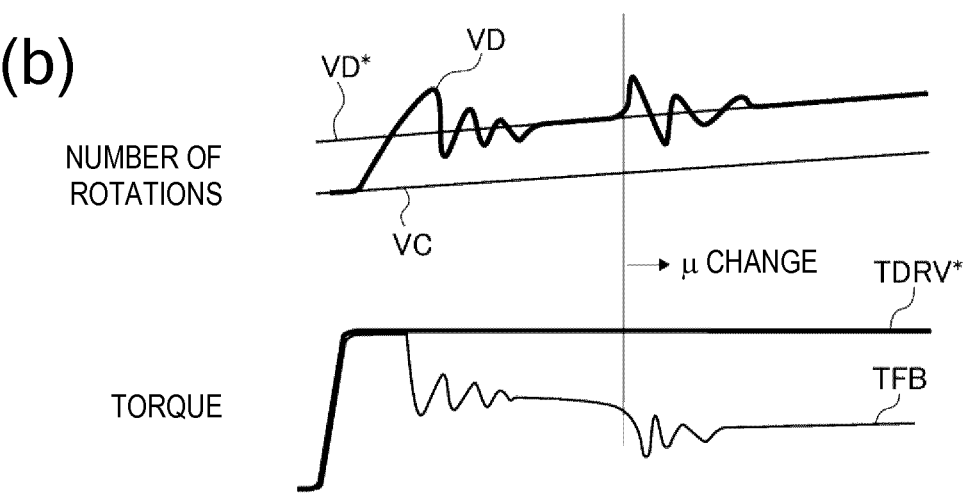
Figure 16:
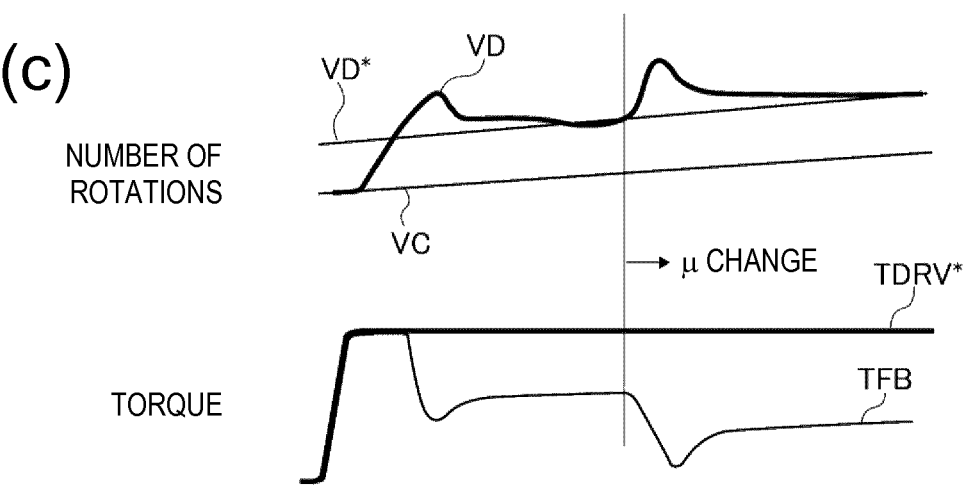

A description is now given of an effect in the slip control acquired by the above-mentioned control configuration. FIG. 16 are time charts for illustrating a relationship between the number of rotations and a torque when the drive slip control is carried out. FIG. 16(a) is a time chart when the configuration of the first embodiment is employed, FIG. 16(b) is a time chart when the configuration of the comparative example of FIG. 3 is employed, and when the control gain is set high, and FIG. 16(c) is a time chart when the configuration of the comparative example of FIG. 3 is employed, and when the control gain is set low. As illustrated in FIG. 16(a), when the drive slip is generated while the driver request torque command value TDRV* is output, the acceleration slip control flag FA is set to 1, and the acceleration slip control torque command value TA* is output so that the drive wheel speed VD converges to the target drive wheel speed VD*. On this occasion, by the configuration of the first embodiment, the acceleration slip control torque command value TA* is directly output from the traction control unit 51 of the brake controller 50 to the motor controller 100 without passing through the vehicle controller 110, and it is understood that the drive wheel speed VD appropriately converges to the target drive wheel speed VD* without a response delay. Moreover, even when such a µ change that the road surface suddenly becomes a frozen road during the travel and the road surface friction coefficient rapidly decreases occurs, the traction control extremely high in the convergence is also realized by the good responsiveness, and it is considered that such a point that the cornering force can be secured due to the good convergence is a fact to be particularly mentioned.

In contrast, in the comparative example of FIG. 16(b), even if the traction control is started after the drive wheel speed VD exceeds the target drive wheel speed VD*, a large overshoot is generated by the response delay. Further, even when the motor torque is decreased in order to converge the overshoot in the number of rotations, the traction control presents an oscillational behavior, and a period is required until the convergence. Moreover, when the µ change occurs, the traction control also presents an oscillational behavior, resulting in a bad convergence. As a solution to the problem of FIG. 16(b), as illustrated in FIG. 16(c), it is conceivable to set the control gain low, thereby suppressing the oscillational behavior. In this case, the oscillational behavior of the control is suppressed, but the period until the drive wheel speed VD converges to the target drive wheel speed VD* is long. During this period, the state in which the slip amount is large continues, and hence a sufficient traction cannot be transmitted between the tire and the road surface. Further, the cornering force also tends to decrease, and a vehicle stability cannot be said to be sufficient. In other words, the extremely large difference in the convergence is generated by the direct command to the motor controller 100 as in the first embodiment. When the vehicle according to the first embodiment actually travels on a frozen road or the like, this effect can provide stability that exceeds stability imagined by desk study, and that a driver has never experienced before.

(Vibration Suppression Control Restriction Value)

A description is now given of a problem regarding the vibration suppression control torque restriction value. As described before, the motor controller 100 includes the vibration suppression control unit 104 so as to apply the vibration suppression control torque for suppressing the high-frequency vibration generated in the powertrain system. On this occasion, a description is given of a reason for applying the vibration suppression control torque. In general, when the driver intends an operation such as the start, the acceleration, or the deceleration, and accordingly operates the accelerator pedal or the brake pedal to express a travel intention, the torque is output from the electric motor 1 in accordance with the intention so that the drive forces are transmitted from the drive wheels to the road surface, or the braking forces are transmitted from the road surface to the drive wheels, resulting in the travel of the vehicle. The driver surely expects a vehicle behavior good in the responsiveness, but a large vehicle inertia exists, and it can be thus said that the driver expects the responsiveness based on the vehicle inertia. Note that, a resonance frequency corresponding to a natural frequency of the large vehicle inertia can be said to belong to a low-frequency area.

On the other hand, the powertrain system of the vehicle has a natural frequency corresponding to an inertia (hereinafter referred to as inertia of the powertrain system) of the electric motor 1, the drive shafts 4, and the drive wheels. A resonance frequency corresponding to this natural frequency belongs to a higher frequency area than the resonance frequency of the vehicle, and a torque fluctuation at a high frequency is recognized as uncomfortable vibration and sound by the driver, and causes a degradation in the drivability. Thus, the vibration suppression control unit 104 focuses on the fluctuation component of the number of motor rotations, and applies the vibration suppression control torque for suppressing the vibration component in the high-frequency area of the fluctuation component to suppress the vibration.

In other words, when the drive wheel is traveling in a grip state, the inertia acting on the powertrain system is the vehicle inertia. Therefore, the resonance frequency causing the vibration is low, and thus little vibration suppression control torque is required. However, when the drive wheel is traveling in the slip state, the acting inertia is the inertia of the powertrain system. Therefore, the resonance frequency is high, which causes a high-frequency torque fluctuation. Thus, a large vibration suppression control torque is required.

On this occasion, upon the vehicle start, or when the friction force (torque) between the drive wheel and the road surface changes abruptly, even when the drive wheel is in the grip state, a frequency upon the abrupt change is recognized as a fluctuation in the number of motor rotations on the high frequency side, which requires the vibration suppression control, and the vibration suppression control torque for suppressing this fluctuation is applied by mistake. Then, even when the actual relationship between the drive wheel and the road surface is in the grip state, and the vibration suppression control torque is thus not necessary because the vehicle inertial is acting, a large vibration suppression control torque is applied, which causes such a fear that the output torque of the electric motor 1 is excessively suppressed. This means that the output of the drive force is reduced upon the driving, and the output of the braking force is reduced upon the braking.

Thus, how to apply the vibration suppression control torque is changed depending on conditions such as whether the travel state is to be considered based on the inertia of the powertrain system or the travel state is to be considered based on the vehicle inertia. Specifically, for the travel state to be considered based on the vehicle inertia, even when the vibration suppression control torque is calculated, the vibration suppression control torque restriction value is decreased so that the actually applied value decreases, and, for the travel state to be considered based on the inertia of the powertrain system, the vibration suppression control torque restriction value is increased so that the actually applied vibration suppression control torque is sufficiently applied.

Figure 17:
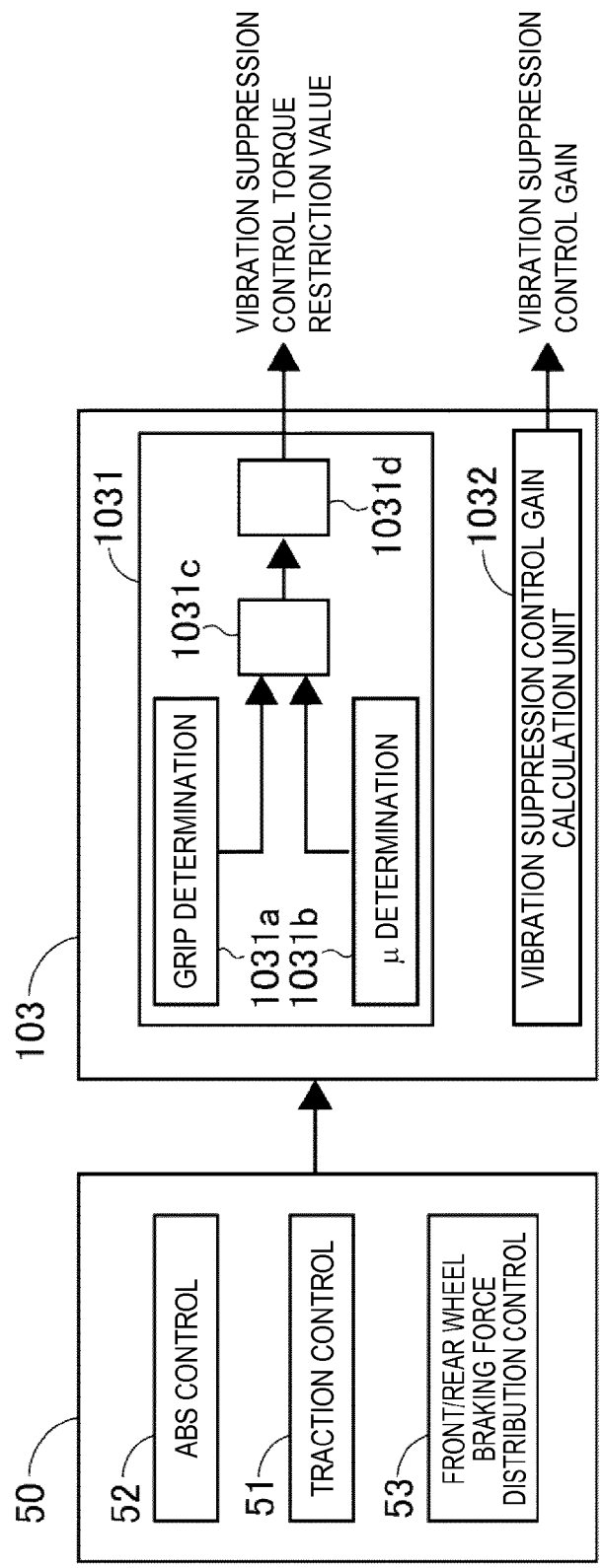
FIG. 17 is a control block diagram for illustrating vibration suppression control restriction value calculation processing according to the first embodiment.

A description is now given of specific vibration suppression control restriction value calculation processing to be carried out in the vibration suppression control information calculation unit 103. FIG. 17 is a control block diagram for illustrating the vibration suppression control restriction value calculation processing according to the first embodiment. The brake controller 50 includes, in addition to the above-mentioned traction control unit 51, an ABS control unit 52 configured to carry out antilock brake control for avoiding a braking lock of the wheel, and a front/rear wheel braking force distribution control unit 53 configured to control a braking force distribution depending on loads on the front/rear wheels. The ABS control unit 52 monitors the slip state of the wheel, and, when the wheel enters a predetermined slip state, decreases a wheel cylinder pressure, thereby avoiding the lock. Moreover, for example, when the load moves to the front wheel side upon the deceleration, and the load on the rear wheel side decreases, the front/rear wheel braking force distribution control unit 53 controls (mainly depressurizes) the wheel cylinder pressure on the rear wheel side so that the difference in the wheel speed between the front wheel side and the rear wheel side is in a predetermined range, thereby avoiding a decrease in the cornering force caused by the lock tendency on the rear wheel side. The brake controller 50 outputs flag information representing the control state of the respective control units, grip information representing the slip states of the wheels, the vehicle body acceleration GC information, and the like to the vibration suppression control information calculation unit 103. Based on these pieces of information, it is determined whether the current state is the state to be considered based on the vehicle inertia or the state to be considered based on the inertia of the powertrain system.

The vibration suppression control information calculation unit 103 includes a vibration suppression control restriction value calculation unit 1031 configured to calculate the vibration suppression control restriction value, and a vibration suppression control gain calculation unit 1032 configured to calculate a vibration suppression control gain. The vibration suppression control restriction value calculation unit 1031 includes a grip determination unit 1031a configured to determine the grip state of the drive wheel, a μ determination unit 1031b configured to estimate a road surface friction coefficient, a restriction value setting unit 1031c configured to determine TL or TH (>TL) as the vibration suppression control torque restriction value, based on the determination result by the grip determination unit 1031a and the determination result by the μ determination unit 1031b, and a change amount restriction unit 1031d configured to impose a restriction on a change amount of the set restriction value, and then output a final vibration suppression control torque restriction value.

The grip determination unit 1031*a* determines the grip state based on various pieces of information received from the brake controller 50. For example, when the acceleration slip control flag FA is ON, the grip determination unit 1031*a* determines that the state is the slip state, and when the acceleration slip control flag FA is OFF, the grip determination unit 1031*a* determines that the state is the grip state. Note that, a difference between the drive wheel speed VD and the estimated vehicle body speed VC may be calculated, and when the difference is equal to or more than a predetermined value, the state may be determined to be the slip state, while when the difference is less than the predetermined value, the state may be determined to be the grip state, or the determination may be made based on other control flag information. The μ determination unit 1031*b* estimates a road surface friction coefficient μ based on a relationship between the current vehicle body acceleration GC and the slip state of the wheel. For example, when the vehicle body acceleration GC is equal to or more than a predetermined value, and the slip ratio of the wheel is less than a predetermined value, μ is determined to be high, and when the vehicle body acceleration GS is less than the predetermined value, and the slip ratio of the wheel is equal to or more than the predetermined value, μ is determined to be low. Note that, when a logic of estimating the road surface friction coefficient exists in the respective control units in the brake controller 50, whether μ is high or low may be determined based on the estimated road surface friction coefficient. Moreover, μ is determined to be whether high or low in the first embodiment, but the road surface friction coefficient may more finely be estimated.

Figures 18, 19:
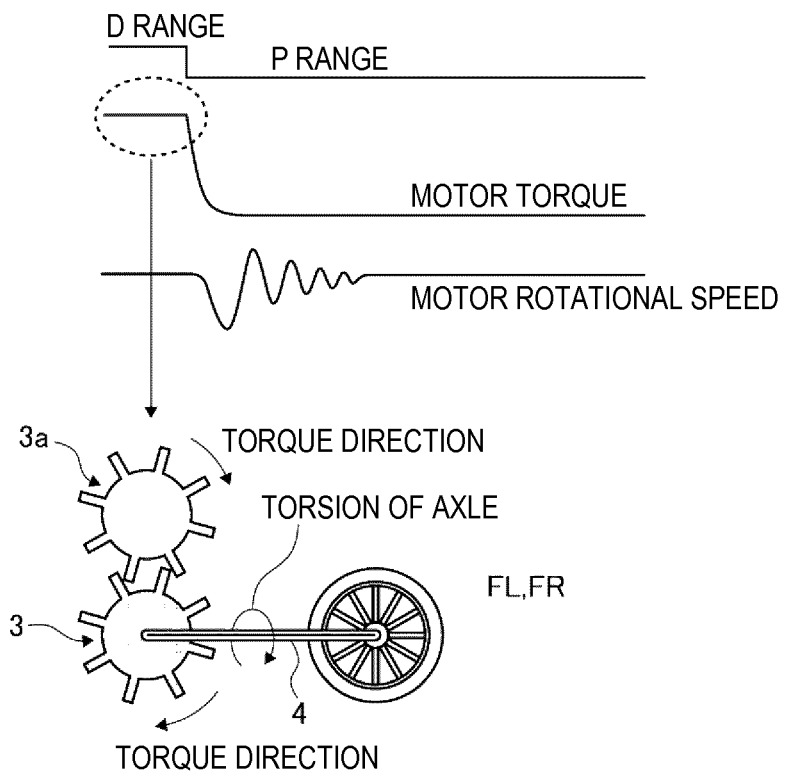
FIG. 18 is a table for showing set values for a vibration suppression control torque restriction value according to the first embodiment.
FIG. 19 is a schematic explanatory diagram for illustrating a problem that arises when a shift range is switched from a D range to a P range in the electric vehicle according to the first embodiment.

The restriction value setting unit 1031*c* sets the vibration suppression control torque restriction value based on the grip state of the drive wheel and the road surface friction coefficient. FIG. 18 is a table for showing set values for the vibration suppression control torque restriction value according to the first embodiment. When the state is determined to be the grip state, and μ is determined to be high, the smaller value TL is set as the restriction value. Specifically, at the time of start on a high μ road, a torque rise frequency of the electric motor 1 is included in the high-frequency area subject to the suppression by means of the vibration suppression control. The rise is only the torque rise upon the start, and the inertia of the vehicle only needs to be considered, but if the rise is considered as the generation of the high-frequency vibration, and the vibration suppression control torque is directly output, the motor torque is excessively suppressed, and a decrease in a travel start performance is caused. Thus, by setting the restriction value to TL, and carrying out control so that a torque larger than TL in the absolute value is prevented from being output as the vibration suppression control torque, excessive addition/subtraction of the motor torque to/from the driver request torque TDRV* are restricted, and a good travel start performance can be secured.

Moreover, even in the grip state, on a low μ road, the state is likely to transition to the slip state, and, in this case, the set value of the vibration suppression control torque restriction value is set to the larger value TH in advance. Specifically, when a slip is generated on the drive wheel, and the acceleration slip control flag FA becomes ON, the slip control torque command value TESC* is calculated, and the driver request torque TDRV* is switched to the slip control torque command value TESC*. Further, the vibration suppression control torque restriction value is changed from TL to TH with the predetermined change amount over a predetermined period. Thus, the vibration suppression control torque restriction value does not abruptly change, and an excessive change in the motor torque is avoided, thereby securing a stable travel state. Further, when the state enters the slip state, and the powertrain system resonates, a large vibration suppression control torque is calculated. On this occasion, the vibration suppression control torque restriction value has been changed to the larger value TH, and thus a sufficient vibration suppression control torque can be applied.

(Control for Vibration Suppression Control Gain)

A description is now given of a problem of the vibration suppression control. FIG. 19 is a schematic explanatory diagram for illustrating a problem that arises when a shift range is switched from the D range to a P range in the electric vehicle according to the first embodiment. In the electric vehicle according to the first embodiment, the torque output from the electric motor 1 is transmitted by meshing between a speed reduction mechanism 3*a* (hereinafter a gear of the speed reduction mechanism 3*a* is referred to as a speed reduction gear 3*a*) and a differential gear 3 (hereinafter referred to as a final speed reduction gear 3 provided on an outer periphery of the differential gear) to the front wheels FL and FR, which are drive wheels, via the drive shafts 4. On this occasion, when the electric vehicle is stopped while the shift range is still in the D range, the number of rotations of the drive wheel becomes 0, but a creep torque is generated. Thus, as represented by the rotational directions of FIG. 19, a tooth surface on the left side of the speed reduction gear 3*a* and a tooth surface on the right side of the final speed reduction gear 3 abut against each other, and the drive shaft 4 is brought into a twisted state.

When, in this state, the driver operates a shift lever from the D range to the P range, the creep torque output from the electric motor 1 decreases, and the force of the speed reduction gear 3*a* pressing the tooth right side of the final speed reduction gear 3 thus decreases. On this occasion, the torque generated by the torsion of the drive shaft 4 is released, and the final speed reduction gear 3 rotates in a direction opposite to the rotational direction illustrated in FIG. 19. A force moving the electric motor 1 in a reverse rotational direction thus applies, and a high-frequency vibration component is generated in the motor rotational speed. Thus, in the vibration suppression control, this high-frequency component of the motor rotational speed is detected, and a vibration suppression control torque, which is a forward rotation side torque for preventing the reverse rotation from being generated in the motor rotational speed, is applied. However, even when the vibration suppression control torque on the forward rotation side is applied, a backlash exists between the speed reduction gear 3*a* and the final speed reduction gear 3, and the load is not generated on the speed reduction gear 3*a* while this backlash is being taken up, with the result that the speed reduction gear 3*a* collides with the tooth surface of the final speed reduction gear 3 after an excessive rotation is generated, thereby generating the vibration caused by this collision. In this way, even if the motor torque of the electric motor 1 is reduced, the vibration suppression control does not appropriately function near the zero torque due to the influence of the backlash, and there poses such a problem that the vibration state is continuously generated. Thus, the vibration suppression control gain calculation unit 1032 is configured to adjust a vibration suppression control gain depending on the travel state and the shift state, thereby suppressing the continuous vibration state near the zero torque.

Figure 20:
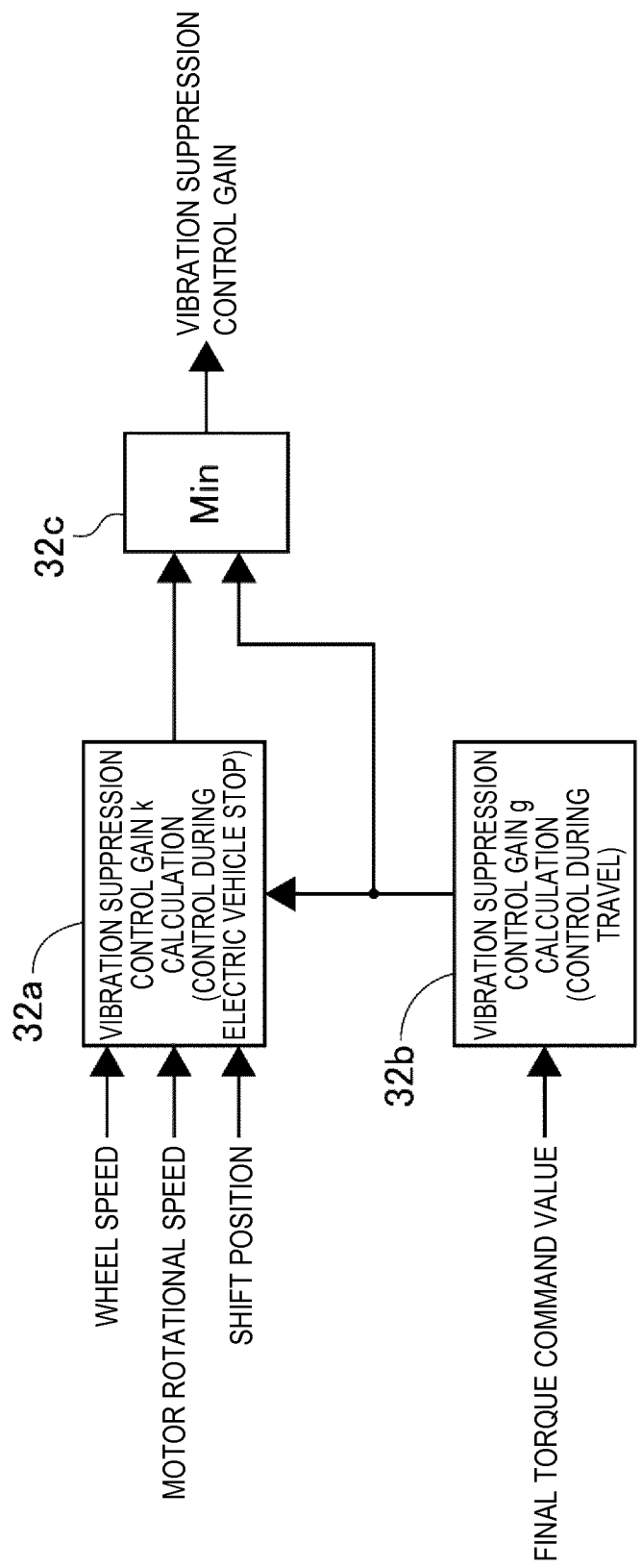
FIG. 20 is a block diagram for illustrating a configuration of a vibration suppression control gain calculation unit according to the first embodiment.

FIG. 20 is a block diagram for illustrating a configuration of the vibration suppression control gain calculation unit according to the first embodiment. The vibration suppression control gain calculation unit 1032 includes a vibration suppression control gain k calculation unit 32a configured to calculate a gain used for control during the stop of the electric vehicle, a vibration suppression control gain g calculation unit 32b configured to calculate a gain used for control during the travel, and a gain selection unit 32c configured to select a smaller gain of the calculated gains k and g, and output the smaller gain as the final vibration suppression control gain.

Figure 21:
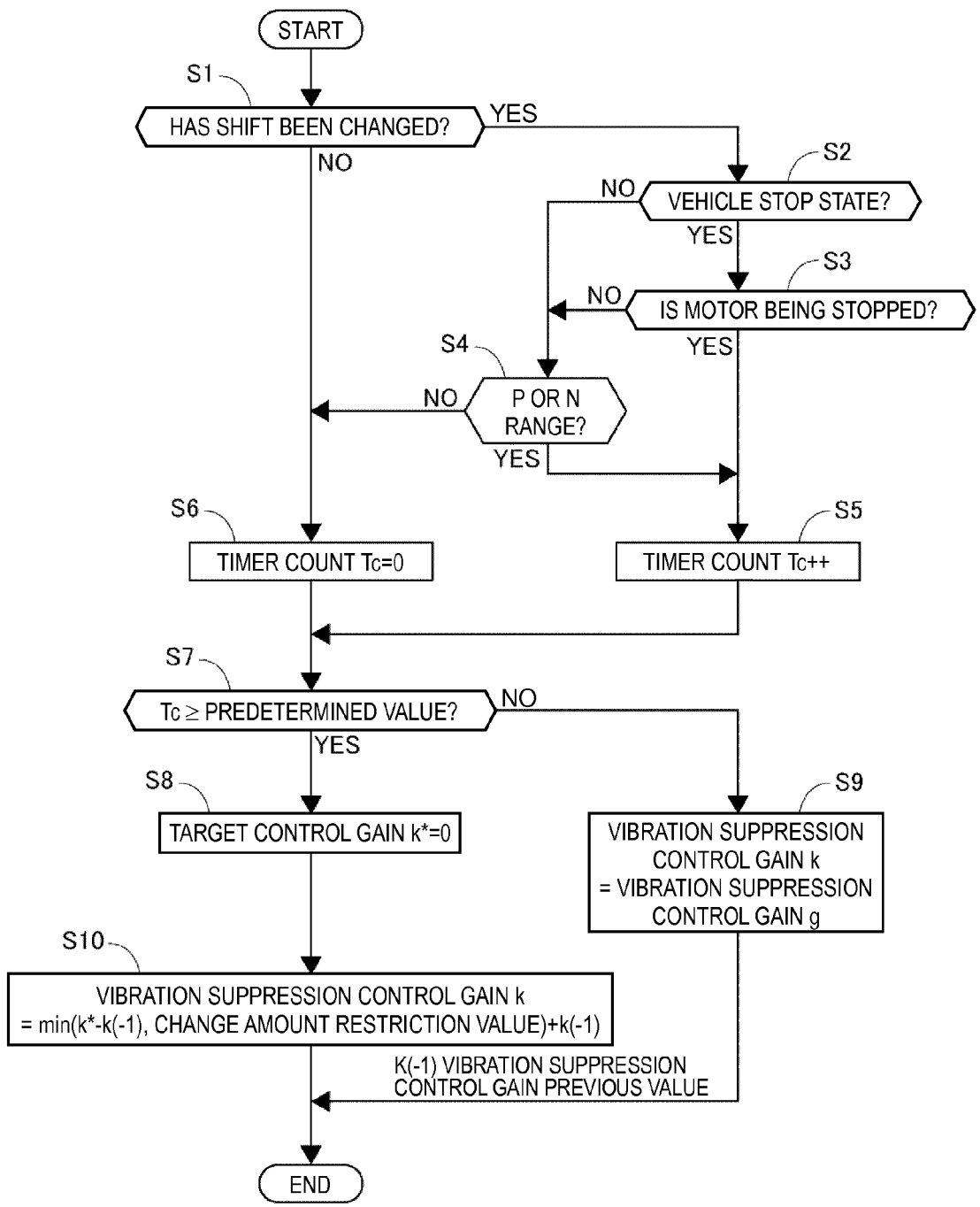
FIG. 21 is a flowchart for illustrating gain control processing in a vibration suppression control gain k calculation unit according to the first embodiment.

FIG. 21 is a flowchart for illustrating gain control processing in the vibration suppression control gain k calculation unit according to the first embodiment. In Step S1, it is determined whether or not the shift position has been changed. When the shift has not been changed, the processing proceeds to Step S6. When the shift has been changed, the processing proceeds to Step S2. Note that, whether or not the shift has been changed is determined by using a shift range detection device such as an inhibitor switch (not shown) for the detection. In Step S2, it is determined whether or not the electric vehicle is in the stop state based on a wheel speed. When the electric vehicle is in the stop state, the processing proceeds to Step S3, and otherwise proceeds to Step S4. This is because, when the electric vehicle is in the stop state, the torsion is accumulated in the drive shaft 4, and the vibration suppression control torque is thus considered to be calculated. In Step S3, it is determined, based on the motor rotational speed, whether or not the electric motor is in the stop state. When it is determined that the electric motor is in the stop state, the processing proceeds to Step S5, and otherwise proceeds to Step S4. This is because, when the electric motor is stopped, the torsion is accumulated in the drive shaft 4 by the generation of the creep torque, and the vibration suppression control torque is thus considered to be calculated.

In Step S4, it is determined whether or not the changed shift position is the P range or an N range. When the changed shift position is the P range or the N range, the processing proceeds to Step S5. When the changed shift position is other than the P range and the N range, the processing proceeds to Step S6. In the P range or the N range, it is considered that, even if the electric vehicle is traveling or is in motion immediately before the stop, the motor torque command value for the electric motor 1 is reduced to 0, and the vibration suppression control torque is calculated as a result of this decrease. At the other shift positions, the travel is intended, the motor torque command value is thus not 0, and a vibration suppression control gain g for the normal travel only needs to be set.

In Step S5, a count value Tc of the timer is incremented. In Step S6, the count value Tc of the timer is set to 0. In Step S7, it is determined whether or not the count value Tc of the timer is equal to or more than a predetermined value. When the count value is equal to or more than a predetermined value, the processing proceeds to Step S8, and otherwise proceeds to Step S9. This predetermined value represents a predetermined period after which the vibration is considered to be sufficiently attenuated by means of the vibration suppression control as a result of the shift change, and is a value set by experiments or the like.

In Step S8, a target control gain k* is set to 0. In Step S9, as the vibration suppression control gain k, the vibration suppression control gain g during the travel is set. In Step S10, the vibration suppression control gain k is calculated by using the following equation.

$$k = \min(k^* - k(-1), \text{change amount restriction value}) + k(-1)$$

where k(−1) represents a previous value of the vibration suppression control gain. Moreover, the change amount restriction value represents the maximum value of a decrease amount when the gain is decreased, and is set as a negative value. This change amount restriction value may be a fixed value, but may be decreased as a difference between the previous value and the target vibration suppression control gain decreases so as to provide a smooth change such as that by a first-order delay.

Figure 22:
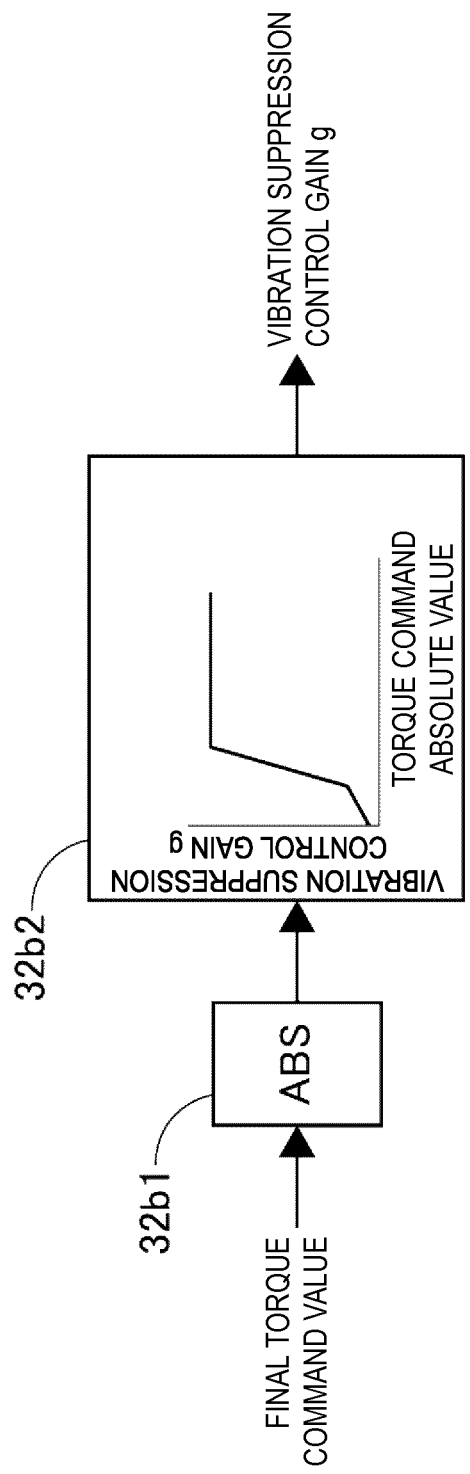
FIG. 22 is a block diagram for illustrating a configuration of a vibration suppression control gain g calculation unit according to the first embodiment.

FIG. 22 is a block diagram for illustrating a configuration of the vibration suppression control gain g calculation unit according to the first embodiment. The vibration suppression control gain g calculation unit 32b includes an absolute value calculation unit 32b1 configured to acquire an absolute value of the final torque command value and a vibration suppression control gain g map 32b2 configured to calculate the vibration suppression control gain g depending on the calculated torque command absolute value. The vibration suppression control gain g map outputs a large gain when the torque command absolute value has a certain amount as that during the travel. On the other hand, even during the travel, the vibration caused by the backlash is generated near the zero torque, and the vibration suppression control gain g is thus decreased. Note that, during the travel, a large torque command may be generated again because the driver changes his or her mind or the like, or a torsional vibration may be generated by interference. Thus, even when the torque command absolute value is 0, the gain g is not set to 0 but to a small value.

Figure 23:
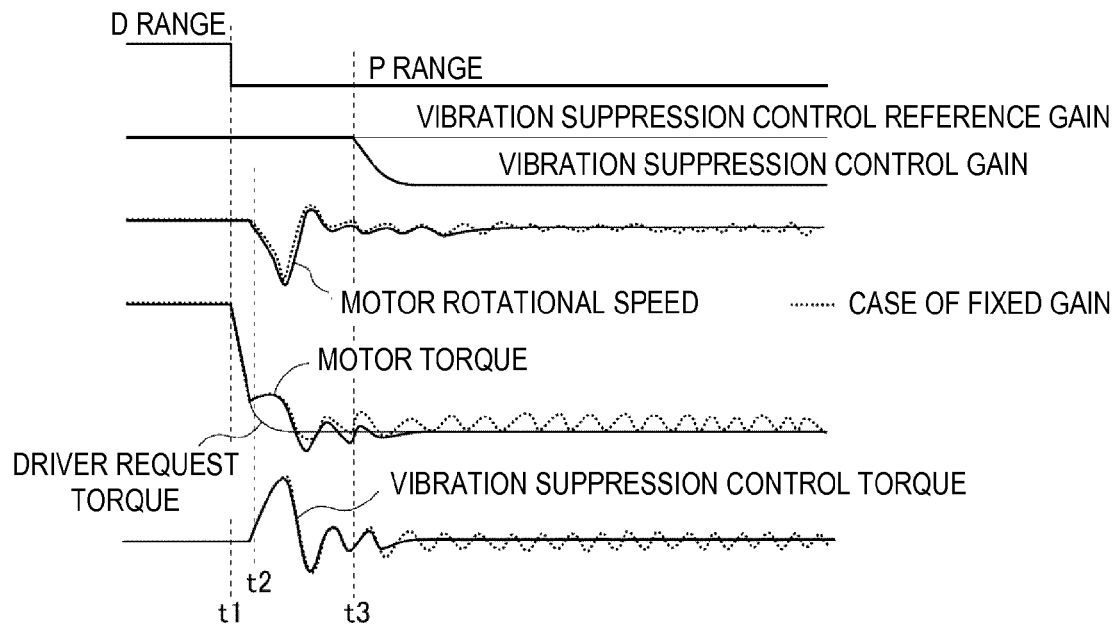
FIG. 23 is a time chart for illustrating a relationship among gains, the number of rotations, and torques, when the shift range is shifted from the D range to the P range in the electric vehicle according to the first embodiment.

FIG. 23 is a time chart for illustrating a relationship among gains, the number of rotations, and torques, when the shift range is shifted from the D range to the P range in the electric vehicle according to the first embodiment. It is assumed that the electric vehicle is stopped while the D range is selected, and the creep torque is acting on the powertrain. At a time point t1, when the shift range is shifted from the D range to the P range by an operation on the shift lever, the motor torque reduces the output of the creep torque, and the driver request torque TDRV* becomes 0. At a time point t2, when the motor torque decreases at once, as a result of the release of the torsion of the drive shaft 4, the rotational variation in the high-frequency component is detected in the motor rotational speed. As a result, the vibration suppression control torque is calculated, the vibration suppression control torque is added to the driver request torque TDRV*, and the torque to which the vibration suppression control torque is added is output as the final torque command value. On this occasion, when the gain g is set to a vibration suppression control reference gain as the vibration suppression control gain, and the control continues while using this vibration suppression control reference gain remains, the continuous vibration may be generated by the influence of the backlash between the speed reduction gear 3a and the final speed reduction gear 3 (refer to the dotted lines of FIG. 23 for the case in which the gain is fixed). Thus, at a time point t3 when the timer value counted up starting from the shift change timing is equal to or more than the predetermined value, the target control gain k* is set to 0, and simultaneously, the vibration suppression control gain k is gradually decreased while the change amount restriction value is imposed. As a result, the vibration suppression control gain k finally becomes 0, and the vibration continuously generated by the vibration suppression control torque and the backlash can be suppressed.

Figure 24:
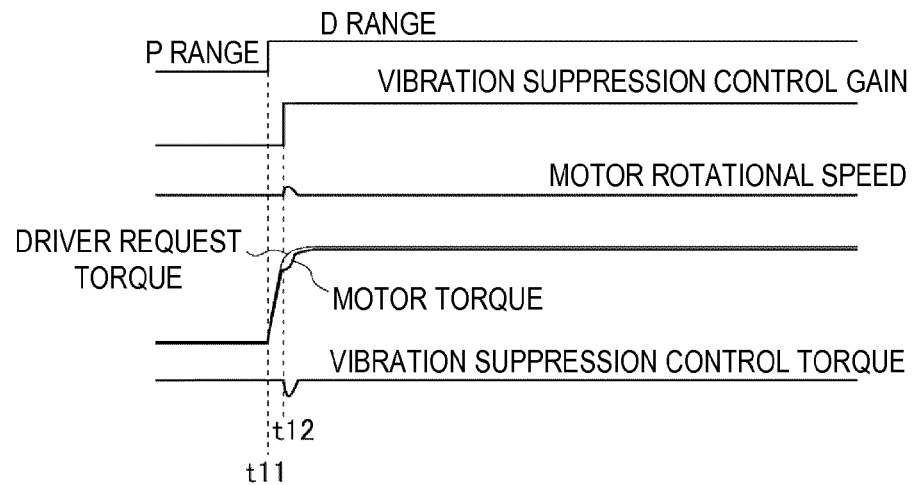
FIG. 24 is a time chart for illustrating a relationship among gains, the number of rotations, and torques, when the shift range is shifted from the P range to the D range in the electric vehicle according to the first embodiment.

FIG. 24 is a time chart for illustrating a relationship among gains, the number of rotations, and torques, when the shift range is shifted from the P range to the D range in the electric vehicle according to the first embodiment. FIG. 24 is an illustration of a state in which the electric vehicle is stopped while the P range is selected, the shift range is then shifted from the P range to the D range while the brake pedal is depressed, and the creep torque is thus output. Note that, it is assumed that the vibration suppression control gain is set to 0 in the P range. At a time point t11, when the driver shifts the shift range from the P range to the D range, the motor torque starts to output the creep torque. On this occasion, in Step S4, the D range is selected, and a determination is thus made to be NO, with the result that the timer count value is set to 0. Thus, the vibration suppression control gain k is set to the vibration suppression control gain g for the travel state even when the electric vehicle is stopped. The motor rotational speed is slightly changed by the backlash and the torsion of the drive shaft 4, and this change in the number of rotations is detected as the high-frequency component. Thus, at a time point t12, the same vibration suppression control torque as that during the travel is output, and the shock caused by the shift change can be avoided.

Figure 25:
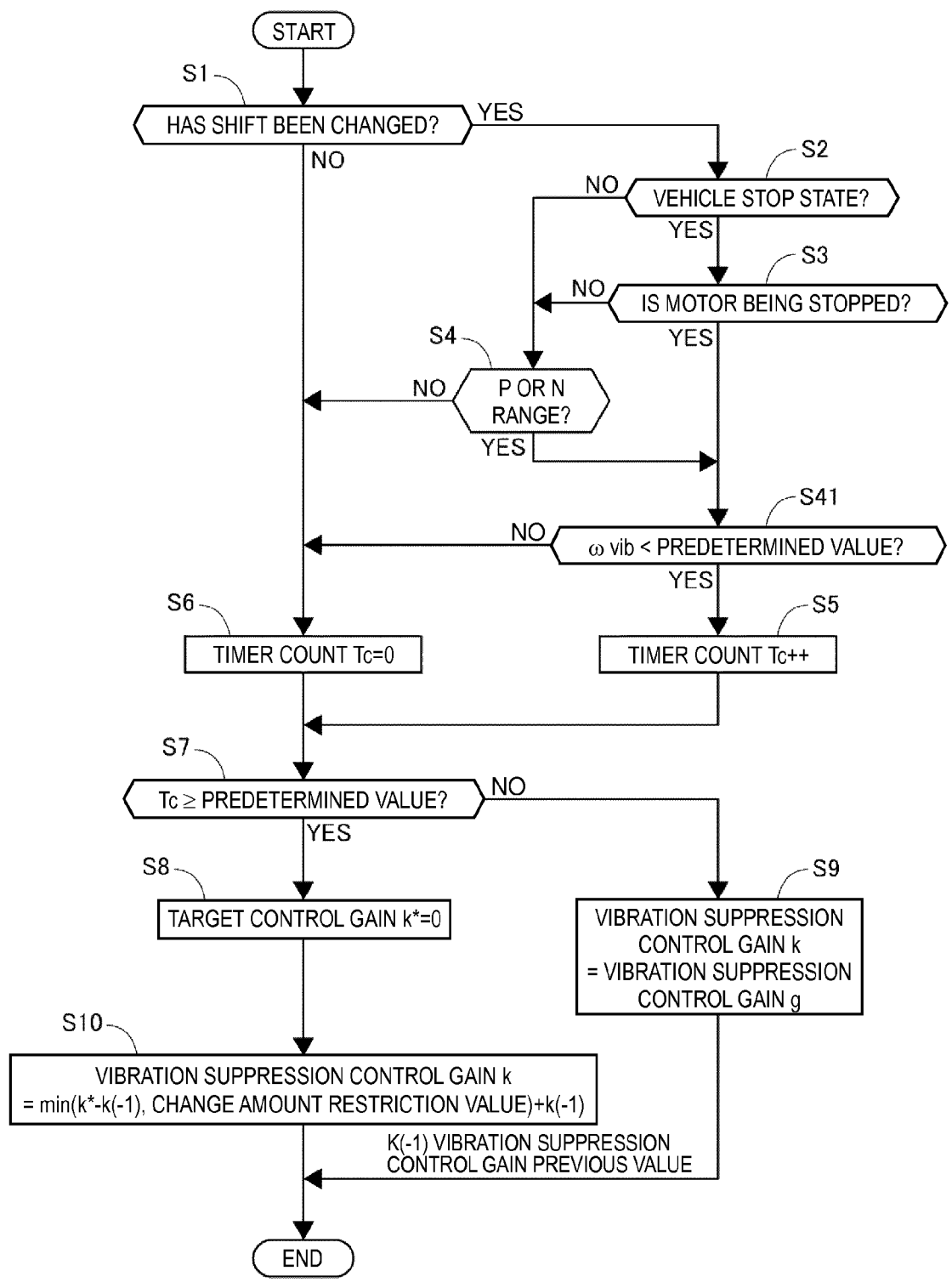
FIG. 25 is a flowchart for illustrating gain control processing in the vibration suppression control gain k calculation unit according to another embodiment of the present invention.

Note that, while, according to the first embodiment, such a configuration that the count-up of the timer is started after the shift change is detected is provided. However, in terms of sufficient suppression of a large vibration by sufficiently applying the vibration suppression control torque, such a configuration that the count-up of the timer is started after an amplitude ωvib of the motor rotational speed becomes less than a predetermined value may be provided. FIG. 25 is a flowchart for illustrating gain control processing in the vibration suppression control gain k calculation unit according to another embodiment of the present invention. Even in the case where the shift has changed and the P range or the N range is selected, when the amplitude ωvib of the motor rotational speed is equal to or more than the predetermined value, the vibration suppression control torque is considered to be sufficiently applied. Thus, in Step S41, when ωvib is determined to be equal to or more than the predetermined value, the processing proceeds to Step S6, and the timer count value is set to 0. In other words, the count-up is not started, the vibration suppression control gain is thus not restricted, and the vibration suppression control torque can sufficiently be applied.

[Effects of First Embodiment]

Effects provided by the control device for an electric vehicle according to the first embodiment are now listed.

(1) There is provided a control device for an electric vehicle, including: an electric motor 1 configured to generate a torque for braking or driving a drive wheel via a speed reduction mechanism 3a and a drive shaft 4 coupled to the speed reduction mechanism 3a; a driver request torque calculation unit 111 (torque command value calculation unit) configured to calculate a rotational torque command value directed to the electric motor 1 based on an accelerator operation or a brake operation by a driver; a vibration suppression control torque calculation unit 104 configured to calculate, in order to suppress a vibration component caused by a resonance of the vehicle, a vibration suppression control torque command value directed to the electric motor 1; and a vibration suppression control gain k calculation unit 32a (unit) configured to control, based on the respective command values, the torque generated by the electric motor 1. The vibration suppression control gain k calculation unit 32a is further configured to reduce, when a predetermined condition is satisfied, the torque generated by the electric motor 1. Thus, the promotion of the vibration can be avoided by reducing the torque generated by the electric motor 1.

(2) In the control device for an electric vehicle described in Item (1), the vibration suppression control gain k calculation unit 32a is further configured to set, when the predetermined condition is satisfied, the torque generated by the electric motor 1 to zero. Thus, even when the vibration suppression control torque is calculated, the torque is set to zero, and the promotion of the vibration can thus be avoided.

(3) In the control device for an electric vehicle described in Item (1), the control device further includes Step S2 of determining a vehicle stop state (vehicle stop state determination unit), and the predetermined condition is that the vehicle stop state determination unit determines that the vehicle is in a stop state. When the vehicle is stopped, the torsion tends to be accumulated in the drive shaft 4, and the vibration tends to be promoted by the influence of the backlash. In this case, the promotion of the vibration can be avoided by reducing the motor torque.

(4) In the control device for an electric vehicle described in Item (1), the control device further includes a shift range detection unit configured to detect a shift range of the vehicle, and the predetermined condition is that the shift range detected by the shift range detection unit is a parking range or a neutral range. This case corresponds to an occasion in which the motor torque is switched from the state in which the torque such as the creep torque is output to the state in which the torque is zero, and, in this occasion, the vibration suppression control torque is applied. On this occasion, the vibration tends to be promoted by the influence of the backlash, and the promotion of the vibration can be avoided by reducing the motor torque.

(5) In the control device for an electric vehicle described in Item (1), the vibration suppression control gain k calculation unit 32a is further configured to set, when the predetermined condition is satisfied, the torque to zero after a predetermined period has elapsed. Thus, while the vibration suppression is achieved by the vibration suppression control torque during the predetermined period, the promotion of the continuous vibration after the elapse of the predetermined period can be avoided.

(6) In the control device for an electric vehicle described in Item (5), the control device further includes a shift range detection unit configured to detect a shift range of the vehicle, and the vibration suppression control gain k calculation unit 32a is further configured to generate the torque, when the shift range detection unit detects a shift from a neutral range or a parking range to another range after the predetermined condition is satisfied. Thus, the vibration suppression control torque caused by the shift to the D range or the like can be generated, and the shock caused by the shift change and the like can be suppressed.

(7) There is provided a control device for an electric vehicle, including: an electric motor 1 configured to generate a torque for braking or driving a drive wheel via a speed reduction mechanism 3a and a drive shaft 4 coupled to the speed reduction mechanism 3a; a driver request torque calculation unit 111 (torque command value calculation unit) configured to calculate a rotational torque command value directed to the electric motor 1 based on an accelerator operation or a brake operation by a driver; a vibration suppression control torque calculation unit 104 (vibration suppression control torque command value calculation unit)

configured to calculate, in order to suppress a vibration component caused by a resonance of the vehicle, a vibration suppression control torque command value directed to the motor; a vibration suppression control gain k calculation unit 32a (motor control unit) configured to control the electric motor 1 based on the respective command values; Step S4 of determining, based on the rotational torque command value, whether or not the torque generated by the motor becomes zero (hereinafter referred to as zero torque determination unit); and a vibration suppression control gain k calculation unit 32a (vibration suppression control torque command value decrease unit) configured to decrease, when it is determined in Step S4 that the torque is in the zero state, the vibration suppression control torque command value. Thus, when the driver request torque TDRV* becomes 0, the vibration suppression control torque is suppressed, and the promotion of the vibration can thus be avoided.

(8) In the control device for an electric vehicle described in Item (7), the driver request torque calculation unit 111 is further configured to set, when the vehicle is in a predetermined state, the rotational torque command value to zero, and the zero torque determination unit is further configured to determine that, when the vehicle is in the predetermined state, the torque is in the zero state. The vibration suppression control torque depending on the state of the vehicle can be output by determining that the torque is in the zero state when the vehicle is in the predetermined state.

(9) In the control device for an electric vehicle described in Item (7), the driver request torque calculation unit 111 is further configured to set, when the vehicle is determined to have stopped, the rotational torque command value to zero, and the zero torque determination unit is further configured to determine, when the vehicle is determined to have stopped, that the torque is in the zero state. When such a determination that the vehicle has stopped is made, the driver is considered not to intentionally require a torque, and, by determining the zero torque, the vibration suppression control torque can be output depending on the state of the vehicle.

(10) In the control device for an electric vehicle described in Item (9), the vibration suppression control torque command value decrease unit is further configured to decrease the vibration suppression control torque command value when a predetermined period has elapsed after the vehicle is determined to be in the stop state. Thus, before the elapse of the predetermined period, the vibration suppression control torque can be applied, and, after the elapse of the predetermined period, the vibration suppression control torque can be reduced, thereby suppressing the continuous vibration.

(11) In the control device for an electric vehicle described in Item (10), the control device further includes a shift range detection unit configured to detect a shift range of the vehicle, the vibration suppression control gain k calculation unit 32a is further configured to set, when the detected shift range is a parking range or a neutral range, the torque command value to zero, and the zero torque determination unit is further configured to determine that the torque is in the zero state when the shift range is the parking range or the neutral range. In the P range or the N range, the driver does not intend to start the vehicle, and the torque can thus be determined to be in the zero state, thereby outputting the vibration suppression control torque depending on the state of the vehicle.

(12) In the control device for an electric vehicle described in Item (7), the control device further includes a shift range detection unit configured to detect a shift range of the vehicle, the vibration suppression control gain k calculation unit 32a is further configured to set, when the detected shift range is a parking range or a neutral range, the torque command value to zero, and the zero torque determination unit is further configured to determine that the torque is in the zero state when the shift range is the parking range or the neutral range. In the P range or the N range, the driver does not intend to start the vehicle, and the torque can thus be determined to be in the zero state, thereby outputting the vibration suppression control torque depending on the state of the vehicle.

(13) In the control device for an electric vehicle described in Item (12), the vibration suppression control gain k calculation unit 32a is further configured to decrease the vibration suppression control torque command value when a predetermined period has elapsed after the shift range is detected to be the parking range or the neutral range. Thus, until the elapse of the predetermined period, the vibration suppression control torque can be applied, thereby realizing effective vibration suppression control, and, after the elapse of the predetermined period, the vibration suppression control torque decreases, and the continuous vibration can thus be avoided.

(14) In the control device for an electric vehicle described in Item (13), the vibration suppression control gain k calculation unit 32a is further configured to stop decreasing the vibration suppression control torque command value, when the shift range detection unit detects a shift from the neutral range or the parking range to another range after the vehicle is determined to be stopped. Thus, when the motor torque is generated in the another range such as the D range, the vibration suppression control torque can be applied to the high frequency vibration component upon a rise of the torque, resulting in stable vibration suppression control.

(15) There is provided a control method for an electric vehicle, the electric vehicle including an electric motor 1 that is coupled to a drive wheel via a speed reduction mechanism 3a and a drive shaft 4, and is configured to generate a braking torque or a driving torque on the drive wheel, the control method including: controlling the electric motor 1 based on a rotational torque command value based on an accelerator operation or a brake operation by a driver, and a vibration suppression control torque command value for suppressing a vibration component caused by a resonance of the vehicle; and decreasing the vibration suppression control torque command value when the vehicle is determined to be stopped or a shift range is switched to a neutral range or a parking range, resulting in a decrease in the rotational torque command value. Thus, the vibration suppression control torque is suppressed by the decrease in the rotational torque command value, and the promotion of the vibration can be avoided.

(16) In the control method for an electric vehicle described in Item (15), when the vibration suppression control torque command value is decreased, the vibration suppression control torque command value is decreased to zero. Thus, the unnecessary continuous vibration can be completely avoided.

(17) In the control method for an electric vehicle described in Item (15), the vibration suppression control torque command value is decreased when a predetermined period has elapsed after the vehicle is determined to be in a stop state. Thus, until the elapse of the predetermined period, the vibration suppression control torque can be applied, thereby realizing effective vibration suppression control, and, after the elapse of the predetermined period, the vibration suppression control torque decreases, and the continuous vibration can thus be avoided.

(18) In the control method for an electric vehicle described in Item (15), the decreasing the vibration suppression control torque command value is finished, when the shift range detection unit detects a shift from the neutral range or the parking range to another range after the vehicle is determined to be stopped. Thus, when the motor torque is generated in the another range such as the D range, the vibration suppression control torque can be applied to the high frequency vibration component upon the rise of the torque, resulting in stable vibration suppression control.

According to this embodiment, the promotion of the vibration can be avoided by reducing the torque generated by the motor.

A description has been given of only some embodiments of the present invention, but it is readily understood by a person skilled in the art that various changes and improvements can be made to the exemplified embodiment without practically departing from the novel teachings and advantages of the present invention. Thus, forms to which such changes and improvements are made are also intended to be included in the technical scope of the present invention.

The present application claims a priority based on Japanese Patent Application No. 2013-196947 filed on Sep. 24, 2013. All disclosed contents including Specification, Claims, Drawings, and Abstract of Japanese Patent Application No. 2013-196947 filed on Sep. 24, 2013 are incorporated herein by reference in their entirety.

All disclosures including Specification, Claims, Drawings, and Abstract of Japanese Patent Application Laid-open No. 2000-125410 (Patent Literature 1) are incorporated herein by reference in their entirety.

REFERENCE SIGNS LIST 1 electric motor
2 resolver
3 differential gear
3a speed reduction mechanism
4 drive shaft
5 hydraulic unit
5a hydraulic pipe
6 high-voltage battery
7 converter
8 accessory battery
9 wheel speed sensor
10 inverter
20 power steering controller
21 steering angle sensor
22 meter controller
50 brake controller
51 traction control unit
60 battery controller
100 motor controller
101 changeover switch
103 vibration suppression control information calculation unit
104 vibration suppression control unit
105 motor current control unit
110 vehicle controller
111 driver request torque calculation unit
511 drive wheel speed calculation unit
512 vehicle body speed estimation unit
513 target drive wheel speed reference value calculation unit
514 acceleration slip control start speed calculation unit
515 acceleration slip control end speed calculation unit
516 acceleration slip control flag calculation unit
517 target drive wheel speed calculation unit
518 acceleration slip control torque command value calculation unit
519 slip control torque command value calculation unit
CAN1 first CAN bus
CAN2 second CAN bus
CAN3 first connection bus
FAExecOK acceleration slip control execution permission flag
FA acceleration slip control flag
FDExecOK deceleration slip control execution permission flag
FD deceleration slip control flag
FH ESC state flag
W/C wheel cylinder

The invention claimed is:

1. A control device for an electric vehicle including a motor configured to generate a torque for braking or driving a drive wheel via a speed reduction mechanism and a drive shaft coupled to the speed reduction mechanism, the control device comprising:
a torque command value calculation unit configured to calculate a rotational torque command value directed to the motor based on an accelerator operation or a brake operation by a driver;
a vibration suppression control torque calculation unit configured to calculate, in order to suppress a vibration component caused by resonance of the vehicle, a vibration suppression control torque command value based on a rotational variation of the motor;
a motor control unit configured to control, based on the rotational torque command value and the vibration suppression control torque command value, the torque generated by the motor;
a vehicle stop state determination unit configured to determine a vehicle stop state; and
a shift range detection unit configured to detect a shift range of the vehicle,
wherein the motor control unit is further configured to reduce the vibration suppression control torque command value regardless of the rotational variation of the motor, after determining, in a drive range in which a creep torque is generated, that the vehicle is in the vehicle stop state, and thereafter the shift range is shifted from the drive range to a parking range or a neutral range, and thereafter a vibration suppression control torque is applied for a predetermined period.

2. The control device for an electric vehicle according to claim 1, wherein the motor control unit is further configured to set the vibration suppression control torque command value to zero when reducing the vibration suppression control torque.

3. A control device for an electric vehicle including a motor configured to generate a torque for braking or driving a drive wheel via a speed reduction mechanism and a drive shaft coupled to the speed reduction mechanism, the control device comprising:
a torque command value calculation unit configured to calculate a rotational torque command value directed to the motor based on an accelerator operation or a brake operation by a driver;
a vibration suppression control torque command value calculation unit configured to calculate, in order to suppress a vibration component caused by resonance of the vehicle, a vibration suppression control torque command value based on a rotational variation of the motor;

a motor control unit configured to control the motor based on the rotational torque command value and the vibration suppression control torque command value;

a shift range detection unit configured to detect a shift range of the vehicle;

a zero torque determination unit configured to determine, based on the rotational torque command value, whether or not the shift range is shifted from a drive range to a parking range or a neutral range and the torque generated by the motor becomes zero after the vehicle is stopped in a drive range in which a creep torque is generated; and a vibration suppression control torque command value decrease unit configured to decrease, after a predetermined period elapses since the zero torque determination unit determines that the torque is in a zero state, the vibration suppression control torque command value, regardless of the rotational variation of the motor.

4. A control method for an electric vehicle including a motor that is coupled to a drive wheel via a speed reduction mechanism and a drive shaft, and is configured to generate a braking torque or a driving torque on the drive wheel, and a motor controller in communication with the motor and configured to carry out torque control, the control method comprising:

controlling, by the motor controller, the motor based on a rotational torque command value, the rotational torque command value being determined based on an accelerator operation or a brake operation by a driver, and a vibration suppression control torque command value to suppress a vibration component caused by resonance of the vehicle; and decreasing, by the motor controller, the vibration suppression control torque command value after a predetermined period elapses since the rotational torque command value decreases due to switching of a shift range from a drive range to a neutral range or a parking range after the vehicle is stopped.

* * * * *